(12) United States Patent
Cheblokov

(10) Patent No.: US 12,444,017 B2
(45) Date of Patent: Oct. 14, 2025

(54) DENOISING DYNAMICALLY RAY-TRACED SCENES USING HISTORICAL PIXEL VALUES

(71) Applicant: NVIDIA Corporation, Santa Clara, CA (US)

(72) Inventor: Timofey Cheblokov, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 250 days.

(21) Appl. No.: 18/356,903

(22) Filed: Jul. 21, 2023

(65) Prior Publication Data
US 2025/0029204 A1   Jan. 23, 2025

(51) Int. Cl.
*G06T 3/40*     (2024.01)
*G06T 5/50*     (2006.01)
(Continued)

(52) U.S. Cl.
CPC .................. *G06T 3/40* (2013.01); *G06T 5/70* (2024.01); *G06T 7/90* (2017.01)

(58) Field of Classification Search
CPC .. G06T 5/50; G06T 5/70; G06T 5/002; G06T 5/20; G06T 15/06; G06T 7/20; G06T 2207/20182; G06T 2207/10024; G06T 2207/20221; G06T 2207/20081; G06T 3/4053; G06T 3/4046; G06T 2207/20084;
(Continued)

(56) References Cited

U.S. PATENT DOCUMENTS

| 5,729,672 A | 3/1998 | Ashton |
| 6,674,430 B1 | 1/2004 | Kaufman et al. |

(Continued)

FOREIGN PATENT DOCUMENTS

| CN | 114331861 A | 4/2022 |
| CN | 114332250 A | 4/2022 |

(Continued)

OTHER PUBLICATIONS

Haines, Eric, et al. (editors), "Ray Tracing Gems: High-Quality and Real-Time Rendering With DXR and Other APIS," Nvidia, Apress Open; Feb. 2019, 622 pages.

(Continued)

*Primary Examiner* — Wesner Sajous
(74) *Attorney, Agent, or Firm* — Foley & Lardner LLP

(57) ABSTRACT

In various examples, systems and methods are disclosed relating to historical acceleration. One method includes determining a plurality of history buffers for a frame, the plurality of history buffers comprising a responsive history buffer and a normal history buffer, the responsive history buffer comprising a first pixel value at a pixel location of the frame, and the normal history buffer comprising a second pixel value at the pixel location of the frame, and the normal history buffer including a second pixel value at the pixel location of the frame. The method further includes determining at least one difference between the first pixel value of the responsive history buffer and the second pixel value of the normal history buffer and updating at least one of the first pixel value or the second pixel value based on the at least one difference and a tuning parameter.

20 Claims, 18 Drawing Sheets

(51) Int. Cl.
  *G06T 5/70* (2024.01)
  *G06T 7/20* (2017.01)
  *G06T 7/90* (2017.01)
(58) Field of Classification Search
  CPC .......... G06N 3/08; G06N 3/048; G06N 3/044; G06N 3/045; G06N 3/049; G06N 20/00; A63F 13/69; G09G 2340/16; G09G 3/2018; G09G 3/2048; G09G 3/2059; G09G 2320/02; G09G 2320/0247; G09G 2320/0271
  See application file for complete search history.

(56) References Cited

U.S. PATENT DOCUMENTS

| | | | |
|---|---|---|---|
| 8,811,769 | B1 | 8/2014 | Pitts et al. |
| 11,216,916 | B1* | 1/2022 | Kozlowski ............... G06T 7/20 |
| 11,232,544 | B1* | 1/2022 | Kozlowski ............... G06T 5/20 |
| 11,508,113 | B2* | 11/2022 | Zhdan ...................... G06T 5/70 |
| 11,600,036 | B2* | 3/2023 | Kozlowski ............. G06T 15/06 |
| 11,783,455 | B2* | 10/2023 | Kozlowski ............... G06T 5/50 |
| | | | 345/618 |
| 11,823,321 | B2* | 11/2023 | Zhdan ...................... G06T 5/70 |
| 12,182,927 | B2* | 12/2024 | Zhdan ................... G06T 15/506 |
| 12,217,386 | B2* | 2/2025 | Shacklett ................. G06T 7/20 |
| 12,299,855 | B2* | 5/2025 | Kozlowski ............... G06T 5/70 |
| 2005/0270428 | A1 | 12/2005 | Park |
| 2007/0071312 | A1 | 3/2007 | Gardella et al. |
| 2014/0247277 | A1 | 9/2014 | Guenter et al. |
| 2015/0287231 | A1 | 10/2015 | Berghoff |
| 2015/0287239 | A1 | 10/2015 | Berghoff |
| 2017/0263046 | A1 | 9/2017 | Patney et al. |
| 2017/0272722 | A1 | 9/2017 | Salvi et al. |
| 2018/0089807 | A1 | 3/2018 | Reusch |
| 2018/0096516 | A1 | 4/2018 | Luebke et al. |
| 2018/0204307 | A1 | 7/2018 | Schied et al. |
| 2018/0204314 | A1 | 7/2018 | Kaplanyan et al. |
| 2018/0301110 | A1 | 10/2018 | Feng et al. |
| 2018/0357749 | A1 | 12/2018 | Young et al. |
| 2019/0035113 | A1 | 1/2019 | Salvi et al. |
| 2019/0206113 | A1 | 7/2019 | Kipp et al. |
| 2019/0311468 | A1 | 10/2019 | Qian et al. |
| 2020/0043122 | A1 | 2/2020 | Xiao et al. |
| 2020/0074605 | A1 | 3/2020 | Goyal et al. |
| 2020/0118492 | A1 | 4/2020 | Meng et al. |
| 2020/0302683 | A1 | 9/2020 | Huang |
| 2021/0295589 | A1* | 9/2021 | Zhdan ...................... G06N 3/08 |
| 2022/0122229 | A1* | 4/2022 | Kozlowski ............... G06T 7/20 |
| 2023/0267676 | A1 | 8/2023 | Gruen |
| 2024/0185400 | A1 | 6/2024 | Petrescu |
| 2025/0029315 | A1* | 1/2025 | Cheblokov ............... G06T 5/50 |

FOREIGN PATENT DOCUMENTS

| | | |
|---|---|---|
| DE | 10 2021 125 774 A1 | 4/2022 |
| DE | 10 2021 125 897 A1 | 4/2022 |
| EP | 2 228 990 A2 | 9/2010 |

OTHER PUBLICATIONS

Herzog, Robert, et al., "Spatio-Temporal Upsampling on the GPU," In Proceedings of the 2010 ACM SIGGRAPH symposium on Interactive 3D Graphics and Games Feb. 2010, (pp. 91-98).

Iglesias-Guitian, Jose A., et al., "Pixel History Linear Models for Real-Time Temporal Filtering," In Computer Graphics Forum, Oct. 2016, (vol. 35, No. 7, 10 pages).

Liang, Weidong, et al, "Spatiotemporal Antialiasing for Rendering 3D Scene with Specular Effect based on Virtual Hit Points," Abstract, Dec. 2019, 2 pages.

Marrs, Adam, et al., "Adaptive Temporal Antialiasing," In Proceedings of the Conference on High-Performance Graphics, Aug. 2018, pp. 1-4.

Pedersen, Lasse Jon Fuglsang, "Temporal Reprojection Anti-Aliasing in INSIDE," In Game Developers Conference, Mar. 2016, 47 pages.

Henrik Philippi et al., "Practical temporal and stereoscopic filtering for real-time ray tracing," 34th Eurographics Symposium on Rendering, Eurographics Association, 2023.

International Search Report and Written Opinion on PCT/IB2024/057621 DTD Feb. 10, 2025.

Lei Yang et al., "A Survey of Temporal Antialiasing Techniques," Computer Graphics Forum, vol. 39, No. 2, pp. 607-621, 2020.

Zheng Zeng et al., "Temporally Reliable Motion Vectors for Real-time Ray Tracing," Computer Graphics Forum, vol. 40, No. 2, pp. 79-90, 2021.

* cited by examiner

DENOISING DYNAMICALLY RAY-TRACED SCENES USING HISTORICAL PIXEL VALUES

BACKGROUND

As display technology advances—along with growing user expectations—there is a need to enhance the quality of content. This includes mitigating noise and artifacts in rendered images used in various applications like video games and animations. Traditional techniques employed in ray tracing—such as temporal accumulation—often present challenges including temporal lag, ghosting, and added computational complexity. Thus, more efficient solutions are sought to improve overall visual quality.

SUMMARY

Some embodiments relate to a method. The method includes determining a plurality of history buffers for a frame, the plurality of history buffers including a responsive history buffer and a normal history buffer. In one or more embodiments, the responsive history buffer may comprise and/or be implemented as a responsive historical frame that includes a first pixel value corresponding to a weighted representation of the frames in the responsive history buffer at a pixel location of the frame. Likewise, the normal history buffer may comprise and/or be implemented as a normal historical frame that includes a second pixel value at the pixel location of the frame. The method further includes determining at least one difference between the first pixel value of the responsive history buffer and the second pixel value of the normal history buffer. The method further includes updating at least one of the first pixel value or the second pixel value based on the at least one difference and a tuning parameter.

In some embodiments, the first pixel value of the responsive history buffer corresponding to the pixel location of the frame at a time t1 and the second pixel value of the normal history buffer corresponding to the pixel location of the frame at the time t1.

In some embodiments, the method further includes scaling the at least one difference according to the tuning parameter to determine a first updated pixel value at the pixel location of the responsive history buffer and a second updated pixel value at the pixel location of the normal history buffer, prior to updating the at least one of the first pixel value or the second pixel value, determining at least one of the first updated pixel value or the second updated pixel value exceeds an expected pixel value of an input, determining a first dampened pixel value of the responsive history buffer at the pixel location based on a difference between the expected pixel value and the first updated pixel value, and a ratio of the difference between the expected pixel value and the first updated pixel value to a first scaled amount corresponding to the first updated pixel value, determining a second dampened pixel value of the normal history buffer at the pixel location based on a difference between the expected pixel value and the second updated pixel value, and a ratio of the difference between the expected pixel value and the second updated pixel value to a second scaled amount corresponding to the second updated pixel value, and updating, towards the expected pixel value, the at least one of the first pixel value or the second pixel value in accordance with the first dampened pixel value and the second dampened pixel value.

In some embodiments, the normal history buffer corresponds to a first convergence rate to an expected pixel value of the input and the responsive history buffer corresponds to a second convergence rate, wherein the first convergence rate is less than the second convergence rate.

In some embodiments, the at least one of the first pixel value or the second pixel value includes accelerating the normal history buffer by translating the first pixel value by an amount determined from the at least one difference and the tuning parameter, wherein accelerating the normal history buffer includes increasing the first convergence rate, and accelerating the responsive history buffer by translating the second pixel value by the amount determined from the at least one difference and the tuning parameter, wherein accelerating the responsive history buffer includes increasing the second convergence rate.

In some embodiments, prior to updating the at least one of the first pixel value or the second pixel value, the method further includes scaling the amount determined from the at least one difference and the tuning parameter by a clamping parameter based on at least one of: a ratio of luminance of two or more of a clamped luminance, a normal luminance at the normal history buffer, or a responsive luminance at the history buffer.

In some embodiments, each of the at least one of the first pixel value or the second pixel value correspond to one or more of a luminance space, a color space, or chrominance space, and wherein the luminance space includes an intensity component, the color space includes a plurality of color components, and the chrominance space includes a color variation component.

In some embodiments, the at least one difference is a color space difference including a component vector of the plurality of color components, and wherein each component of the component vector is scaled based on the tuning parameter.

In some embodiments, the method further includes providing the updated at least one of the first pixel value or the second pixel value to at least one of the responsive history buffer or the normal history buffer, respectively, wherein updating the at least one of the first pixel value or the second pixel value occurs during a ray-tracing process for the frame, and wherein the at least one of the first pixel value or the second pixel value is stored in at least one of the responsive history buffer or the normal history buffer, respectively, and outputting, to a display device, content including an updated pixel value of the updated plurality of pixel values corresponding to the normal history buffer.

In some embodiments, the determining the at least one difference and updating the at least one of the first pixel value or the second pixel value are based on temporally accumulated pixel data stored in the responsive history buffer and the normal history buffer without introducing new noise or using the expected pixel value of the frame.

In some embodiments, determining the at least one of the first pixel value or the second pixel value, determining the at least one difference, and updating of the at least one of the first pixel value or the second pixel value is based on the pixel location of one pixel.

Some embodiments relate to a system. The system includes a temporal accumulator system to temporally accumulate pixel data associated with a plurality of history buffers for a frame and provide the temporally accumulated pixel data, wherein the plurality of history buffers including a responsive history buffer and a normal history buffer, the responsive history buffer including a first pixel value at a pixel location of the frame, and the normal history buffer including a second pixel value at the pixel location of the frame. The system further includes a history system to receive the temporally accumulated pixel data corresponding to the first pixel value and the second pixel value, determine at least one difference of the first pixel value and the second pixel value, update at least one of the first pixel value and the second pixel value based on the at least one difference and a tuning parameter. The system further includes a spatial filterer system to apply one or more spatial filters to the updated at least one of the first pixel value and the second pixel value and output the updated and spatially filtered at least one of the first pixel value and the second pixel value.

In some embodiments, the first pixel value of the responsive history buffer corresponding to the pixel location of the frame at a time t1 and the second pixel value of the normal history buffer corresponding to the pixel location of the frame at the time t1.

In some embodiments, the normal history buffer corresponds to a first convergence rate to an expected pixel value of the input and the responsive history buffer corresponds to a second convergence rate to the expected pixel value, wherein the first convergence rate is less than the second convergence rate.

In some embodiments, the at least one of the first pixel value or the second pixel value includes accelerating the normal history buffer by translating the first pixel value by an amount determined from the at least one difference and the tuning parameter, wherein accelerating the normal history buffer includes increasing the first convergence rate, and accelerating the responsive history buffer by translating the second pixel value by the amount determined from the at least one difference and the tuning parameter, wherein accelerating the responsive history buffer includes increasing the second convergence rate.

In some embodiments, prior to updating the at least one of the first pixel value or the second pixel value, the history system is further to scale the amount determined from the at least one difference and the tuning parameter by a clamping parameter based on at least one of: a ratio of luminance of two or more of a clamped luminance, a normal luminance at the normal history buffer, or a responsive luminance at the history buffer.

In some embodiments, each of the at least one of the first pixel value or the second pixel value correspond to one or more of a luminance space, a color space, or chrominance space, and wherein the luminance space includes an intensity component, the color space includes a plurality of color components, and the chrominance space includes a color variation component.

In some embodiments, the at least one difference is a color space difference including a component vector of the plurality of color components, and wherein each component of the component vector is scaled based on the tuning parameter.

In some embodiments, the determining the at least one difference and updating the at least one of the first pixel value or the second pixel value are based on temporally accumulated pixel data stored in the responsive history buffer and the normal history buffer without introducing new noise or using the expected pixel value of the frame, and wherein determining the at least one of the first pixel value or the second pixel value, determining the at least one difference, and updating of the at least one of the first pixel value or the second pixel value is based on the pixel location of one pixel.

Some embodiments relate to a system. The system includes an application programming interface (API) to interface with one or more applications executed using one or more circuits, the API to cause the one or more circuits to determine a plurality of history buffers for a frame, the plurality of history buffers including a responsive history buffer and a normal history buffer, the responsive history buffer including a first pixel value at a pixel location of the frame, and the normal history buffer including a second pixel value at the pixel location of the frame, determine at least one difference between the first pixel value of the responsive history buffer and the second pixel value of the normal history buffer, and update at least one of the first pixel value or the second pixel value based on the at least one difference and a tuning parameter.

BRIEF DESCRIPTION OF THE DRAWINGS

The present systems and methods for historical acceleration and reset are described in detail below with reference to the attached drawing figures, wherein.

DETAILED DESCRIPTION

Figure 1:
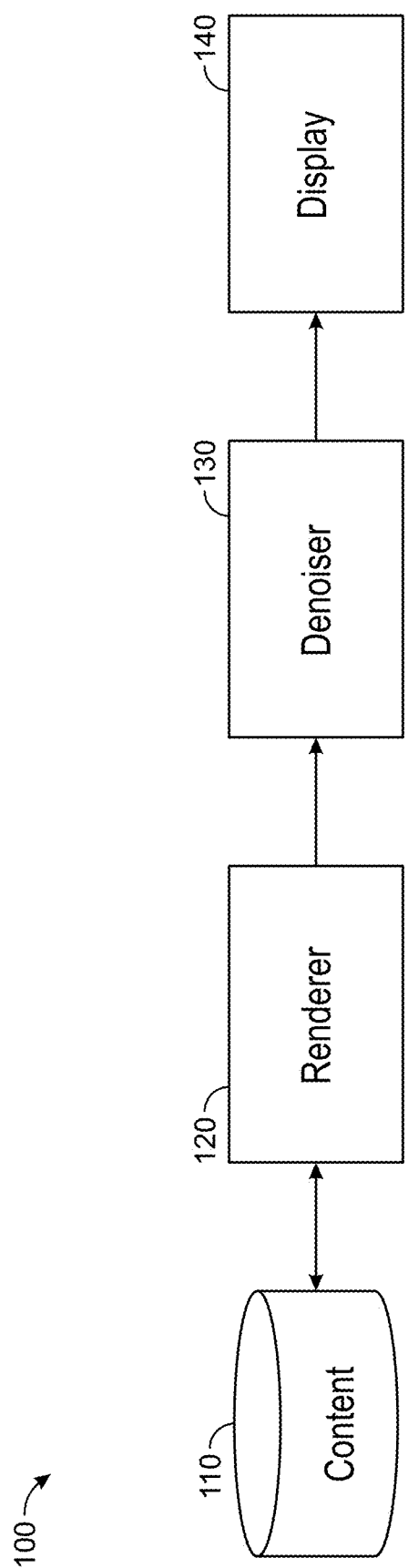
FIG. 1 is an example image generation system, according to one or more embodiments.

Approaches in accordance with various embodiments can address limitations in existing methods of image generation. In particular, various embodiments can provide for improved denoising of image artifacts, such as artifacts that may be introduced by ray tracing or other image generation or rendering techniques, including effects like shadows, ambient occlusion (AO), reflections, and direct lighting. In a system for generating images or video frames for a dynamically rendered scene, there can be various artifacts resulting from changes to the scene relative to previously rendered frames of the scene. One strategy to mitigate these artifacts is temporal accumulation, which retains information from previously-generated frames in a sequence, and applies that information for temporal smoothing. Here, pixel colors in the current frame are blended with colors at the same pixel locations from past frames, minimizing ghosting and other artifacts, and allowing a smoother color transition.

While this strategy can reduce artifacts, it can also lead to noticeable ghosting due to the system not recognizing scene changes, resulting in temporal lag. To address the temporal lag, many systems use one or more heuristic techniques to detect dynamic events, assess their impact on the scene and accumulated signal, and decide when to preserve or discard the accumulated signal. However, discarding historical data can compromise the denoising quality, as fewer frames are temporally accumulated, resulting in increased noise levels in the denoising output.

To mitigate the issues related to compromising the denoising quality, some systems implement denoising solutions that utilize responsive history buffers. Unlike normal history buffers, responsive history buffers can be used to react more quickly to changing lighting conditions while maintaining relatively low noise levels. While such a technique may provide an improvement in denoiser responsiveness, implementations can still lack sufficient responsiveness in highly dynamic scenes. Additional refinements such as history clamping, which is reliant on the variance of the signal, can create problems in high-variance scenes (e.g., scenes a low number of rays/samples or poor sampling patterns). This can lead to a slow response to changing input and the existence of long-lasting tails in the luminance of the denoiser output.

The present disclosure relates to systems, methods, and application programming interfaces (APIs) for improving denoiser responsiveness in dynamic scenes using historical acceleration. In some scenarios, the convergence speed of a normal history buffer and a responsive history buffer can be different. Thus, the differences in convergence speeds can be used on a per-pixel basis to determine a distance between the pixel color values of frames of the normal and responsive history buffers. The difference along with a scaling factor (sometimes referred to herein as a "tuning parameter") can be used to determine historical acceleration of both normal and responsive history buffers. Specifically, historical acceleration can be determined and applied to one or more frames of the normal history buffer and the responsive history buffer to generate new color values that improve the convergence speed to an expected pixel value.

For example, when there are changes in lighting conditions, such as a ray-traced scene illuminant rapidly turning on or off, both the normal and responsive histories will gradually transition to new results in the color space. However, due to the different convergence speeds after the switching, the system can calculate the difference in pixel values (e.g., in the luminance space or color space) at pixel locations between the normal history pixel value and responsive history pixel value along multiple frames (or points in time) during convergence. In some embodiments, the systems and methods can multiply or adjust the difference of each frame at a particular pixel location by a scaling factor, and then update (or add) the current pixel value of the normal history pixel value and the responsive history pixel value by the scaled amount of the difference. As a result, the systems and methods described, utilizing history acceleration, improves denoiser architectures by increasing the architectures ability to adapt to changing lighting conditions (i.e., responsiveness) and provide a more refined rendering outcome.

Additionally, the present disclosure relates to systems, methods, and APIs for improving denoiser responsiveness in dynamic scenes using historical reset. That is, both normal history and responsiveness history are enhanced using determined reset thresholds (or ranges) and amounts that accommodate for changes in lighting conditions without untimely resets or discarding all (or relevant) historical buffer data.

Thus, an improved denoiser architecture is achieved by balancing the responsiveness and quality of historical buffers. Specifically, these systems and methods leverage both the temporal and spatial variance of the signal to determine the amount of history reset, which are used to distinguish between genuine changes in the scene from random noise, providing more accurate, and timely adjustments to the denoised output.

For example, when there are changes in lighting conditions, such as a ray-traced light source switching on or off, the history buffers (e.g., normal, responsive) will gradually transition to new results in the color space. However, a problem often arises with traditional denoiser systems where noise in the input data can be mistaken for genuine changes in lighting conditions. Furthermore, relying solely on spatial variance can lead to issues in scenes with uneven lighting conditions, such as a bumpy surface lit from one side, as the brightly lit areas can artificially inflate the spatial variance. As a result, the systems and methods described, utilizing historical reset guided by both temporal and spatial variances, improve denoiser architectures by increasing the ability to adapt to changing lighting conditions (i.e., responsiveness) and provide a more refined rendering outcome. Additionally, the denoiser architecture is able to mitigate the responsiveness issues by determining a range of pixel value tolerances based on the combination of spatial and temporal variances, which can be adapted to different techniques for light transport simulation and different scene complexities. Accordingly, the denoiser architecture enables the systems and methods to maintain output quality while reacting to changes in the scene in the same frame, minimizing ghosting and other artifacts without increasing the output noise levels.

Referring now to FIG. 1, an illustration of components of an example image generation system 100 that can be utilized in accordance with various embodiments. In at least one embodiment, content such as video game content or animation can be generated using a renderer 120, rendering engine, or other such content generation system or component. This renderer 120 can receive input for one or more frames of a sequence, and can generate images or frames of video using stored content 110 modified based at least in part upon that input. In at least one embodiment, this renderer 210 may be part of a rendering pipeline that can provide functionality such as deferred shading, global illumination, lit translucency, post-processing, and graphics processing unit (GPU) particle simulation using vector fields.

In some embodiments, an amount of processing necessary for generating such complex, high-resolution images can make it difficult to render these video frames to meet current frame rates, such as at least sixty frames per second (fps). In at least one embodiment, a renderer 210 may be used to generate a rendered image at a resolution lower than one or more final output resolutions in order to meet timing requirements and reduce processing resource requirements. A renderer 210 may instead render a current image (or a current image may otherwise be obtained) that is at a same resolution as a target output image, such that no upscaling or super-resolution procedure is required or utilized. In at least one embodiment, if a current rendered image is of a lower resolution, then this low-resolution rendered image can be processed using an upscaler of the renderer 210 to generate an upscaled image that represents content of the low resolution rendered image at a resolution that equals (or is at least more closely approximates) a target output resolution.

This current rendered image, whether upscaled or not, can be provided as input to a denoiser 130 (sometimes referred to an "image reconstruction system") that can generate a high resolution, anti-aliased output image using the current image and data for one or more previously-generated images, as may be at least temporally stored in one or more history buffers or other such locations. The previously-generated images can be a single historical image in some embodiments, where pixel (e.g., color, luminance, chrominance) values are accumulated over a number of prior frames using, for example, an exponential moving average. In at least one embodiment, the denoiser can use various techniques or implementations with one or more history buffers to improve convergence to a nice, sharp, high-resolution output image, which can then be provided for presentation via a display 140 or other such presentation mechanism. For example, enhanced image achieved by the denoiser 140 can be provided in a visual interface on display 140 for the user. In some embodiments, the display 140 can be implemented in various forms such as an LCD, OLED, or quantum dot display, capable of high resolutions and refresh rates, designed to reproduce the high-quality, anti-aliased, and denoised images produced by the denoiser 130, thereby providing the user with an enhanced and improved visual experience.

In general, the denoiser 130 can be configured to analyze and manipulate the images' pixel values according to the models and algorithms implementing the historical acceleration and reset. As a part of this operation, the denoiser 130 can use normal and responsive history buffers to provide an enhanced blend of noise reduction, temporal stability, and system responsiveness. The denoiser 130 may implement methods to identify dynamic scene changes and adapt the denoising procedure accordingly. For example, the denoiser 130 can use the temporal and spatial variance of the signal to detect sudden changes in light conditions and determine a historical reset amount. The various implementations and operations of the denoiser 130 described herein allow for the generation of an output image that is less noisy, more refined and closer to the desired output, thereby increasing the visual appeal of the rendered scene on display 140, whether it be in video games, animations, or other similar applications. Additional details regarding the denoiser 130 are provided below with reference to FIG. 2.

Figure 2:
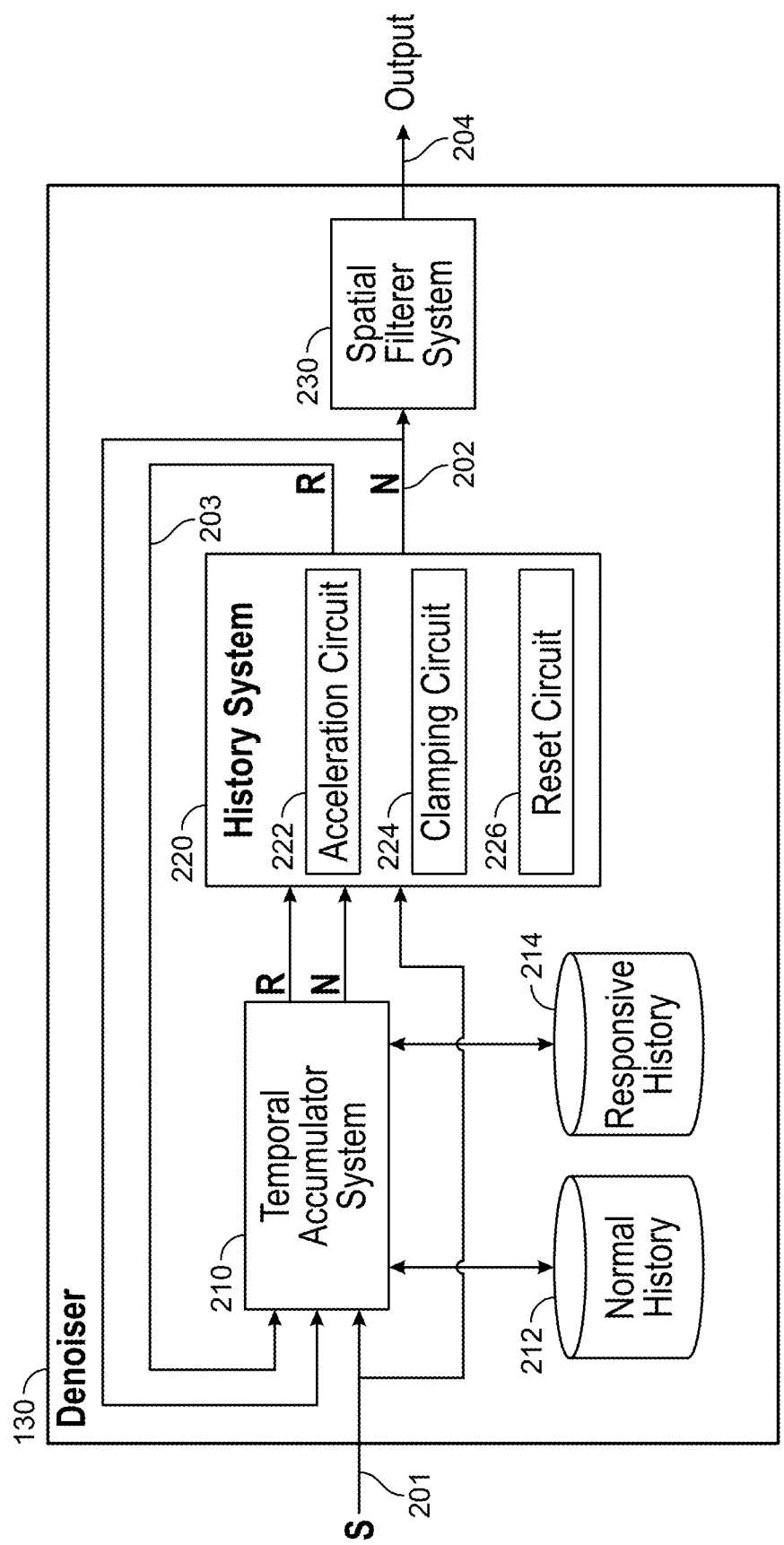
FIG. 2 is a block diagram depicting an implementation of a denoiser system, according to one or more embodiments.

Referring now to FIG. 2, a denoiser 130 for reducing image artifacts and improving rendering quality in dynamic scenes, according to some embodiments. In some embodiments, the denoiser 130 can include a temporal accumulator system 210, a history system 220, a spatial filterer system 230, and one or more history buffers or storages (e.g., normal history buffer 212 and responsive history buffer 214). As shown, the renderer 120 can provide an input signal 201 (S) including generated images or frames of video. The input signal 201 can be received by the temporal accumulator system 210. Additionally, the temporal accumulator system 210 can also receive responsive history data (e.g., accelerated or reset history buffers) and normal history data (e.g., accelerated or reset history buffers). In some embodiments, the temporal accumulator system 210 can temporally accumulate pixel data associated with a plurality of history buffers, and can provide the temporally accumulated pixel data to the history system 220.

In general, in a system for generating images or video frames for a dynamic scene, there can be various artifacts resulting from changes in the scene. Temporal accumulation can be used to attempt to minimize a presence of at least some of these artifacts. A temporal accumulation approach can retain information from previously-generated frames in a sequence to attempt to provide at least some amount of temporal smoothing, where colors of pixels in a current frame are blended with colors from previous frames to attempt to minimize ghosting and other such artifacts, and provide for a smoother transition of colors in the scene. In some embodiments, temporal accumulation approaches can include the use of three inputs/buffers. A first buffer or input can be a current buffer or input signal 201 that contains data for a current frame, such as a most recent frame received from rendered 120. A second buffer can be a normal history buffer 212 that contains a significant number of frames, such as thirty (30) frames for a given application but may range from about 10 to 100 frames or more for other applications. These frames can be accumulated over time with a use of exponential moving average. A third buffer can be a responsive history buffer 214 that contains a much higher blend weight than is used for the normal history buffer 212, such as on the order of a magnitude higher, such that fewer history buffers contribute to the responsive history.

In some embodiments, the temporal accumulator system 210 can output a plurality of history buffers to the history system 220 and store the historical frames in their respective buffers (e.g., normal and responsive). These historical frames can capture pixel data, including information about luminance, color, and/or chrominance. The normal history buffer 212 can store a collection of these frames. That is, the normal history buffer 212 stores a record of the scene's evolution. The responsive history buffer can be characterized by a higher blend weight, and can store a smaller selection of historical frames. Both buffers store historical frames and aid the denoising process, but their differing convergence rates allow them to serve distinct roles. That is, the normal history buffer 212 can provide the denoiser architecture with detailed, gradual frame transition data over time, while the responsive history buffer 214 can provide the denoiser architecture with the ability to respond quickly to abrupt changes.

In some embodiments, the temporal accumulator 210 of denoiser 130 can apply an exponentially decaying weight to the accumulated data (e.g., stored in buffers 212 and 214 or received from the history system 220, such as accelerated or reset history buffers), where newer data carries more weight than older data. In particular, consider the data as a sequence of rendered frames from a scene. The most recently rendered frame (the newest data) has the highest significance, and therefore the most influence on the final denoised output. As the accumulated data move backwards through the sequence, each frame can be associated with progressively less weight, reflecting its decreasing relevance (influence) to the current scene state. Thus, this method allows the denoiser 130 to be at least somewhat responsive to changes in the lighting.

For example, if the lights in the scene were to turn off suddenly, the temporal accumulator would begin to receive input data corresponding to an unlit scene (i.e., black pixels). As the newest data, these black pixels would carry significant weight and would start to influence the accumulated data almost immediately. Over the course of several frames, the older, brighter data would lose its weight, and the accumulated pixel data would start to darken, reflecting the current, unlit state of the scene. It should be understood in this method, the transition to the new lighting state is not instantaneous. Due to the exponentially decaying weight, some influence from the older, brighter frames persists for a time, resulting in a gradual darkening of the scene over hundreds of frames (e.g., 5-10 seconds). Once the older data has sufficiently decayed, the accumulated pixel data will stabilize, reflecting the new, unlit state of the scene. This example illustrates the capacity of the temporal accumulator system 210 to adapt to significant changes in scene lighting over time. However, with history acceleration and/or historical reset, the temporal accumulator system 210 and the denoiser 130 can provide improvements over existing denoiser architectures.

Generally, the history system 220 can be configured to modify accumulated values of one or more normal or historical history buffers using various techniques such as clamping, historical acceleration, or historical reset. While clamping can be used to generate a denoised output, it should be understood that the present disclosure is related to improving denoiser responsiveness in dynamic scenes using historical acceleration and historical reset. Thus, while the specifics and improvements of the acceleration circuit 222 and the reset circuit 226 will be expanded upon below, it should be understood understand that they don't operate in isolation. They work collaboratively with the clamping circuit 224, balancing and harmonizing their actions to create a denoised output that adapts to the dynamic scene evolution.

Referring specifically now to the acceleration circuit 222 within denoiser 130, the circuit (or system) is designed and configured to provide an efficient and dynamic solution for improving the responsiveness of the denoising process in varied lighting conditions. The acceleration circuit 222 works in conjunction with two temporal accumulation buffers, namely the normal history buffer 212 (sometimes referred to as a "normal accumulation buffer 212") and the responsive history buffer 214 (sometimes referred to as a "responsive accumulation buffer 214"), each of which accumulates the input noisy signal with different weighting values. In a typical operation, the normal history may be accumulated using an exponential moving average that has a blend weight of 0.05, while the responsive history might employ a larger blend weight, for instance, 0.5. In situations where lighting conditions remain static, the normal and responsive histories converge to a consistent stable output. In such a context, the per-pixel difference between these two history buffers in the color space is small when compared to the variance of the input signal. Therefore, any attempt to clamp the normal history to the responsive history causes minimal alterations to the normal history. Contrarily, under varying lighting conditions, such as when a light source toggles on or off, both the normal and responsive histories exhibit a shift towards a new result within the color space. However, this shift occurs at different speeds—the normal history exhibits a slower transition, while the responsive history adapts more swiftly.

Accordingly, the acceleration circuit 222 can utilize this variance in convergence speeds between the normal and responsive histories. In some embodiments, it does so by calculating the per-pixel distance within the color space between the normal and responsive histories. This calculated distance can then be multiplied by a constant scaling factor K, where K serves to define the extent of history acceleration. In some embodiments, the resultant value can be subsequently added to both the normal and responsive histories. That is, this addition enables the acceleration circuit 222 to fast-track the movement of the denoiser's output towards the new accumulated result while reducing the potential for a significant increase in the noise level at the denoiser's output. The acceleration circuit 222 also facilitates a faster convergence of both histories towards the new results. As such, the acceleration circuit 222 maintains the robustness of denoiser architectures that employ normal and responsive history and also enhances the denoiser's responsiveness.

In some embodiments, the acceleration circuit 222 can implement a multi-step process to improve the denoising effect in response to changes in the scene. The first step can include determining a plurality of history buffers at a particular point in time for a specific pixel location. For example, the set of history buffers could include a responsive history buffer and a normal history buffer. A weighted, aggregate frame or other representation of the responsive history buffer can be stored as a responsive history buffer 214, while another weighted, aggregate frame or other representation of the normal history buffer can be stored as a normal history buffer 212. Each of the frames in the respective buffers can include pixel values at the specified pixel location of the frame. For example, the frame or other representation of the responsive history buffer may include a first pixel value, and the frame or other representation of the normal history buffer may include a second pixel value. In the subsequent step, the acceleration circuit 222 can determine at least one difference between the first pixel value of the responsive history buffer and the second pixel value of the normal history buffer. This determination identifies the variations in the pixel values in the two frames at the same pixel location. In another subsequent step, the acceleration circuit 222 can update at least one of the first pixel value or the second pixel value. This update is based on the previously determined difference and a tuning parameter, specifically, a scaling factor (e.g., denoted as K). Thus, the updating process includes adding the product of the pixel difference (e.g., denoted as d), and the scaling factor K to the pixel value that is being updated. By implementing this process, the acceleration circuit 222 can accelerate the convergence of the denoising process, thereby enhancing the system's responsiveness to changes in scene lighting or other visual elements.

In some embodiments, the acceleration circuit 222 can include one or more application programming interfaces (APIs). Specifically, the API can enable the acceleration circuit 222 to receive accumulated pixel values of buffers from the temporal accumulator system 210, which maintains a plurality of history buffers, including the responsive history buffer and the normal history buffer. Additionally, the API allows the acceleration circuit 222 to perform history acceleration operations. Through these operations, the acceleration circuit 222 manipulates the pixel values in the history buffers based on the determined differences and a tuning parameter. Furthermore, the API can provide accelerated pixel values to other components of the denoising system or external applications. Accordingly, the API within the acceleration circuit 222 functions as a command and data interface for the acceleration circuit 222 to interact with the temporal accumulator system 210 and other components within denoiser 130. This API standardizes requests for accumulated pixel values, execution of history acceleration operations, and output of accelerated pixel values. The API's protocols define specific methods and data formats that the acceleration circuit 222 uses for communication with other system components, thereby improving the operations such as requesting accumulated pixel values, executing history acceleration, and outputting accelerated pixel values.

In some embodiments, an application programming interface (API) serves as a bridge between the denoiser 130 and one or more applications executed using one or more circuits. This API allows external applications or systems (e.g., renderer 120, content 110) to interact with the functionality of the denoiser 130, which includes an acceleration circuit 222. Specifically, the API can issue commands to the acceleration circuit 222 to execute key procedures such as determining a plurality of history buffers for a frame and calculating the difference between the pixel values of the respective buffers. Furthermore, the API facilitates the update of these pixel values based on the computed difference and a specific tuning parameter. The tuning parameter, in this context, represents a scaling factor used to influence the rate of convergence in the denoising process. Therefore, by harnessing the capabilities of the API, the external applications can leverage the responsiveness of the acceleration circuit 222 to manage and enhance the denoising process dynamically, resulting in a more refined and high-quality visual output. The incorporation of this API within the denoising system provides the dual benefits of enhanced visual results and seamless interactivity between various system components, thus making the denoiser 130 more versatile and effective in responding to changes in lighting conditions and other visual elements.

In some embodiments, the acceleration circuit 222 can receive the two history outputs from the temporal accumulator system 210. These two history outputs, shown as the normal history output 202 and the responsive history output 203, can be updated by the acceleration circuit 222. Following these updates, the histories are reintroduced as inputs into the temporal accumulator system 210 for processing with the subsequent frame. In particular, the acceleration circuit 222 can be configured to update one or more normal history frames and responsive history frames before reintroducing them into the input of the temporal accumulator system 210 for the subsequent frame. In some embodiments, the acceleration process is facilitated through the use of screen space buffers. These buffers, stored in memory, maintain a per-pixel history of the data, and their size. Over time and across multiple frames, the screen space buffers, specifically, the normal history buffer 212 and the responsive history buffer 214, accumulate the contents of these pixels, which represent the results of ray tracing per pixel over multiple frames.

Furthermore, the normal history output 202, as generated by the history system 220, is also fed as an input into the spatial filterer system 230. Subsequently, the spatial filterer system 230 applies a filtering technique, such as A-Trous wavelet filtering to this input, which results in the generation of the denoised output 204 from the denoiser 130. In some embodiments, when the convergence rates between the normal and responsive histories differ, the acceleration circuit 222 can perform historical acceleration. This process can be implemented for each frame and for every pixel. Additionally, in conditions where the signal is stable or an acceleration could cause an unstable output (e.g., with errors, additional noise, etc.), the historical acceleration process may not alter the signal (described below in greater detail). However, changes in the lighting conditions can trigger a divergence in the normal and responsive histories, which in turn can cause the historical acceleration process, implemented by the acceleration circuit 222, to produce a difference in the luminance (or color value) of the signal.

In some embodiments, to improve the operation of the acceleration circuit 222, several heuristics can be used to maintain stability in the denoiser output, prevent the accumulation of errors, and avoid potential oscillations resulting from overshooting. In some embodiments, to maintain the stability of the denoiser output when the lighting conditions are constant, the acceleration circuit 222 can implement a stability heuristic (or control). That is, the amount of acceleration applied to a pixel value in a history buffer can be scaled by a factor determined by the amount of history clamping. Consequently, the degree of acceleration applied to each pixel value within a history buffer is scaled by a factor that can be determined by the extent of history clamping. This clamping amount can be computed based on the luminance of the signals using the following ratio (Equation 1):

$$\text{ratio }(r) = \frac{(L_{clamped} - L_{normal})}{(L_{responsive} - L_{normal})}$$

where $L_{clamped}$ is the luminance of the clamped history, $L_{normal}$ is the luminance of the normal history, and $L_{responsive}$ is the luminance of the responsive history. This ratio, r, assumes a value of 0 when clamping does not alter the normal history, and it approaches 1 when clamping does modify the history. As a result, the degree of acceleration is adjusted dynamically, being applied when the history is altered due to the clamping operation.

In certain embodiments, the luminance-based computation can be extended to RGB color space (or another color space) to incorporate color information into the acceleration control process. The acceleration circuit 222 can utilize a similar ratio as the one described above, but for each color component of the RGB spectrum independently, to maintain the stability of the denoiser output in varying lighting conditions (Equation 2):

$$\text{ratio }(r) = \frac{(RGB_{clamped} - RGB_{normal})}{(RGB_{responsive} - RGB_{normal})}$$

where $RGB_{clamped}$ is the RGB values of the clamped history, $RGB_{normal}$ is the RGB values of the normal history, and $RGB_{responsive}$ is the RGB values of the responsive history. This ratio, r, assumes a value of 0 when clamping does not alter the normal history, and it approaches 1 when clamping does modify the history. These ratios can be computed for each of the red, green, and blue components independently. As in the luminance-based case, these ratios assume a value of 0 when clamping does not affect the normal history, and approach 1 when clamping changes the history. By doing so, acceleration can be applied more accurately in response to the RGB color space, improving the responsiveness of the denoiser 130.

In some embodiments, to address a potential source of error related to history clamping, the acceleration circuit 222 can implement an accumulation prevention heuristic (or control). Since history clamping, which operates in the YCoCg color space, can introduce a small bias that accumulates over time, it becomes important to recalculate the difference between normal history and responsive history in color space. While maintaining the use of luminance difference between normal and responsive history, this strategy replaces the color space distance between the two histories with the distance to the input noisy signal. In some embodiments, while history clamping in the YCoCg color space is efficient, it may occasionally introduce slight biases due to its non-linear nature. Such biases can accumulate over time, especially under drastic changes in lighting conditions, resulting in perceptible discoloration or desaturation in some pixels of the denoised output. To rectify this, an adjustment can be made by recalculating the difference between the normal and responsive histories in color space, while retaining the luminance difference. Rather than relying on the color space distance between the two histories, this approach considers the distance to the input noisy signal. To further decrease the potential increase of noise at the denoiser output, the input noisy signal can be averaged over a 5×5 pixel area (shown with reference to 907, region r1 of FIG. 9). In some embodiments, this value can then be scaled down to the luminance difference. In some embodiments, the history acceleration is a linear operation can be applied after color clamping, helping mitigate this bias by moving both normal and responsive history signals in the color space towards the unbiased input noisy signal for every pixel. The operation can be applied to both normal and responsive histories using the same scaling factor to maintain the luminance distance between the two histories. This ensures the same color clamping and history acceleration logic is applied over multiple frames to every pixel until the pixel color values in the normal and responsive history buffers align with the altered input noisy signal, thereby reducing accumulated errors over time.

As shown, the acceleration operations apply adjustments to one or more pixel values in the history buffers, effectively moving the accumulated signal towards the input noisy signal. This is achieved by adding certain values (e.g., color, luminance values) to the histories. However, to prevent the signal from overshooting beyond the noisy input value, a control process can be applied. Thus, to prevent overshooting, which can introduce oscillations, the acceleration circuit 222 can implement an overshooting prevention heuristic (or control). In particular, the overshooting prevention heuristic can include calculating the ratio of the luminance of acceleration to the luminance of the distance to the input noisy signal in color space. If this ratio exceeds 1, the acceleration circuit 222 can determine there is a risk of overshooting. To counteract this, the acceleration circuit 222 can reduce the acceleration amount by this luminance ratio, thereby preventing overshooting and ensuring a stable denoiser output.

As used herein, "overshooting" refers to a situation where the history buffer pixel value exceeds the target noisy input pixel value. In particular, an overshooting event could compromise the accuracy and stability of the denoiser output. Thus, a balance between the acceleration amount and the pixel value distance between the noisy input signal and the accumulated signal in the history buffer (e.g., responsive or normal) is desired. To prevent overshooting, the magnitude of the added color value (also known as the acceleration amount) in either color or luminance space should not exceed the corresponding distance between the noisy input signal and the signal in the accumulated history buffer. The acceleration circuit 222 can employ this by computing the ratio of the distance in the color or luminance space (as applicable) between the noisy input signal and the signal in the history buffer, to the magnitude of the acceleration amount in the same space. In some embodiments, if this ratio falls below 1.0, it can imply a potential overshooting scenario. To prevent this, the actual acceleration amount is divided by this ratio, thereby ensuring that the magnitude of the acceleration amount does not surpass the corresponding distance between the noisy input signal and the signal in the accumulated history buffer. Additional information regarding the acceleration process and the implementation of the acceleration circuit 222 are described in greater detail with reference to FIGS. 3-9.

Referring specifically now to the clamping circuit 224 within denoiser 130, the circuit (or system) is designed and configured to clamp and blend frames. In some embodiments, a responsive history frame can be pulled from the responsive history buffer 214 when the denoiser 130 is to generate a next output frame in the sequence. It can be desirable to blend a newly rendered current frame with one or more history buffers (e.g., or an aggregate or cumulative representation thereof) to provide for at least some temporal smoothing of the image to reduce a presence of artifacts when displayed. The clamping determination can be made using the responsive history buffer, which will include historical data accumulated over a number of previous frames, such as the prior two to four frames in a sequence. The clamping circuit 224 can analyze a number of pixels in a region around a pixel location to be analyzed, such as pixels in a 3×3 pixel neighborhood of the responsive historical image. Neighborhoods larger than 5×5 can be used, but may introduce additional spatial bias for at least some dynamic scenes. The clamping circuit 224 can then determine a distribution of expected pixel (e.g., color) values for that pixel. This expected distribution can then be compared against a value for a corresponding pixel in the normal historical image. If the normal historical pixel value is outside the distribution of expected values, then the pixel value can be constrained ("clamped") to, for example, the closest value to the historical pixel value that is within the distribution of expected values. Instead of clamping to the current value, which may lead to ghosting, noise, or other artifacts, the clamping circuit 224 can clamp to an intermediate value that is determined using the responsive history buffer. The clamping circuit 224 can then take the values, clamped or otherwise, from the normal history buffer and blend accordingly with pixels of the current frame as discussed herein. This new image can then be processed by the temporal accumulator system 210 to generate updated historical images to be stored in the historical buffers 212 and 214 for reconstructing a subsequent image.

Additionally, the clamping circuit 224 can perform the clamping analysis by using a responsive history buffer. This history buffer is generated by accumulating historical information for the individual pixels using an identified accumulation factor or blend weight. In some embodiments, the historical information can be updated based on the acceleration circuit 222 (i.e., accelerating the historical information) or the reset circuit 226 (i.e., resetting the historical information). As mentioned, while an accumulation factor for a normal history buffer may be on the order of around 0.05, an accumulation factor for a responsive frame may be much larger, such as on the order of 0.5, such that contributions from older frames are minimized much more quickly. Minimal additional effort is needed to accumulate and re-project responsive history in a system that is already accumulating normal or "long" historical information. In this example, the blend weight is used with an exponential moving average of past frame data in order to avoid storing data for each of those past frames in memory. Data accumulated in history is multiplied by (1-weight) and then combined with the data in the current frame, which may be multiplied by the blending weight. In this way, a single frame or other representation of a history buffer can be stored in each buffer (i.e., normal history buffer 212 and responsive history buffer 214) where contributions of older frames are lessened according to the recurrent accumulation approach. In at least one embodiment, this accumulation weight can be adjusted automatically based on any of a number of factors, such as a current frame rate to be provided, total variance, or amount of noise in produced frames.

Figure 18:
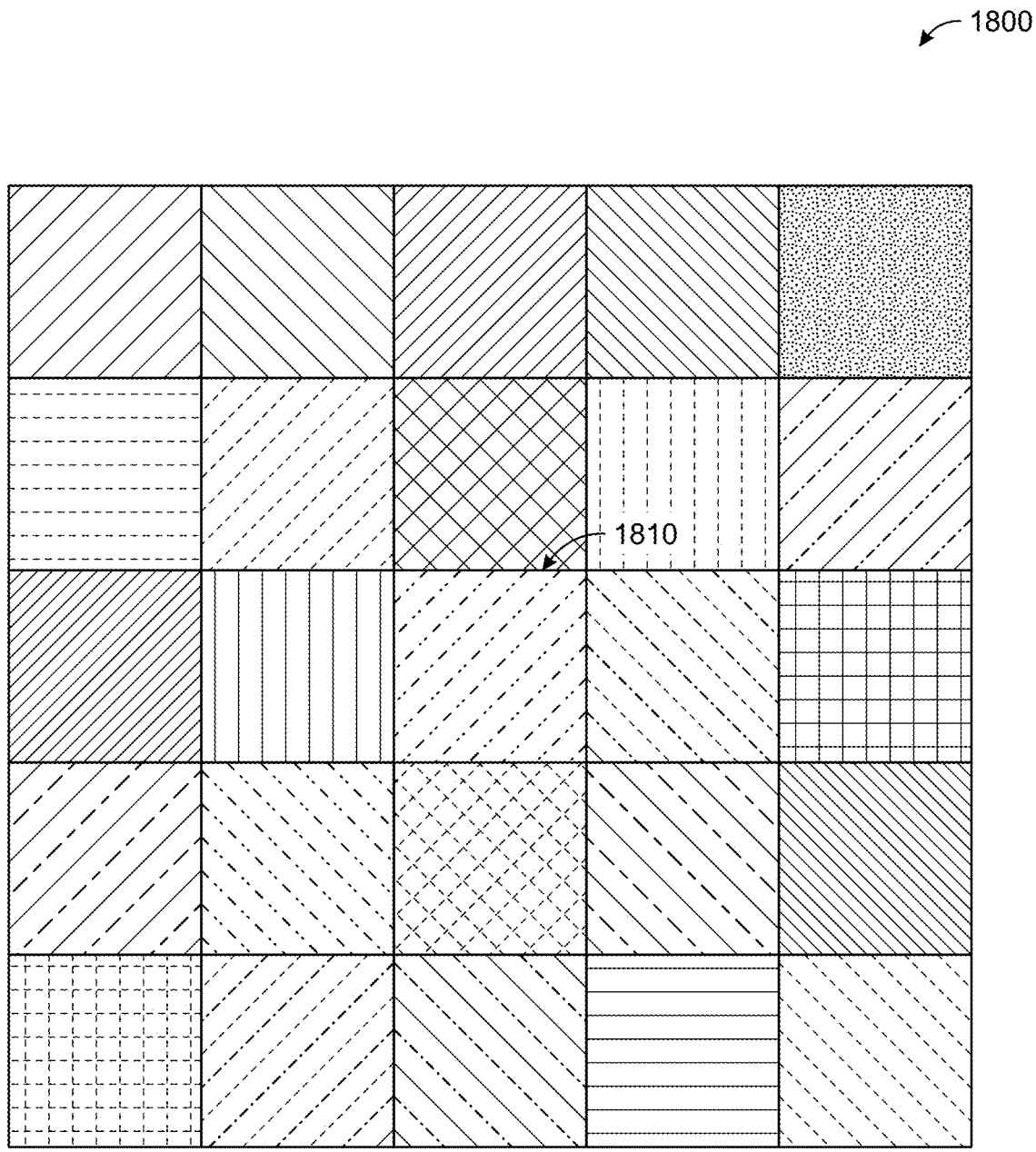
FIG. 18 is an illustrative example of a pixel region, according to one or more embodiments.

When a clamping analysis is to be performed by the clamping circuit 224, data for points in a surrounding neighborhood (e.g., a 3×3 neighborhood, a 5×5 neighborhood, shown with reference to FIG. 18) for each pixel location in a responsive history buffer can be determined.

These pixel values can each be thought of as color points in a three-dimensional color space. While red-green-blue (RGB) color space may be utilized in various embodiments, there may be other color spaces (e.g., YIQ, CMYK (cyan, magenta, yellow, and black), YCoCg, or HSL (hue, saturation, brightness value)) with other numbers of dimensions utilized in other embodiments. When determining pixel values for a history buffer that may be reasonably expected based on these points, various approaches can be utilized to determine these expected values. The expected value can be at, or within, a volume defined by these points, or a reasonable amount of distance outside this volume, as may be configurable and may depend at least in part upon the approach taken. Any of a number of projection or expectation algorithms or networks can be utilized to determine or infer a size and shape of an expectation region. In one embodiment, a convex hull-based approach can be utilized. In at least one embodiment, this expectation region can be determined using a mean and variance distribution. Various other regions, boxes, ranges, or determinations can be used as well within the scope of the various embodiments.

Referring specifically now to the reset circuit 226 within denoiser 130, the circuit (or system) is designed and configured to provide an efficient and dynamic solution for improving the responsiveness of the denoising process in varied lighting conditions. The reset circuit 226 works in conjunction with two temporal accumulation buffers, namely the normal history buffer 212 (sometimes referred to as a "normal accumulation buffer 212") and the responsive history buffer 214 (sometimes referred to as a "responsive accumulation buffer 214"), each of which accumulates the input noisy signal with different weighting values. As shown, the reset circuit 226 can receive normal buffers, responsive buffers, and an input signal 201 (S) as input which can be used to perform the operations of reset circuit 226. In general, the reset circuit 226 can be configured to utilize both temporal and spatial variances of the history buffer (e.g., normal or responsive history buffers) in determining the amount of history reset. In some embodiments, when lighting conditions change, for instance, when a ray-traced light toggles on or off, the properties of the noisy input to the denoiser change, affecting both the mean value and the temporal and spatial variances on a per-pixel basis. This change can be tracked and processed by the reset circuit 226, informing decisions on history reset.

In some embodiments, the reset circuit 226 can include one or more application programming interfaces (APIs). Specifically, the API can enable the reset circuit 226 to receive input signal 201 (S) and receive accumulated pixel values of buffers from the temporal accumulator system 210, which maintains a plurality of history buffers, including the responsive history buffer and the normal history buffer. Additionally, the API allows the reset circuit 226 to perform history reset operations. Through these operations, the reset circuit 226 manipulates the pixel values in the history buffers based on various determination described herein. Furthermore, the API can provide reset pixel values to other components of the denoising system or external applications. Accordingly, the API within the reset circuit 226 functions as a command and data interface for the reset circuit 226 to interact with the temporal accumulator system 210 and other components within denoiser 130 and outside denoiser 130 (e.g., renderer 120). This API standardizes requests for accumulated pixel values, execution of history reset operations, and output of reset pixel values. The API's protocols define specific methods and data formats that the reset circuit 226 uses for communication with other system components, thereby improving the operations such as requesting accumulated pixel values, executing history reset operations, and outputting reset pixel values.

In some embodiments, the reset circuit 226 can temporally accumulate the color signal and the square of the input signal 201 (S), which allows the calculation of the temporal variance and standard deviation of the pixel value of the signal. Spatial variance of accumulated history can also be calculated by the reset circuit 226 in a 5×5 pixel area surrounding the current pixel (shown with reference to FIG. 18). These determined values can define a range of input signal luminance (or color space) within which signal changes can be tolerated and history can be maintained. In some embodiments, an amount of history reset (e.g., of the pixel value of the normal or history buffer at a particular historical frame) can be determined based on the difference between accumulated and input signal luminance (or pixel value), and the calculated tolerance range. A parameter, which defines the desired responsiveness of the denoiser, can be applied, resulting in a history reset amount. Another step in this dynamic denoising process can include pulling the accumulated history (and responsive history) towards the raw noisy input (input signal 201) using a factor defined by the calculated history reset amount. The output of this can then be used as input for the temporal accumulation stage for the next frame.

Referring to the process of reset in greater detail, the reset circuit 226 can determine a temporal or spatial variance, and in turn determine a temporal and spatial sigma (or standard deviation). In some embodiments, the accumulated luminance (or color value) squared and RGB values are stored in a 4-channel responsive (or normal) buffer (e.g., RGBL$^2$, stored in responsive history buffer 214). In some embodiments, the reset circuit 226 can determine the temporal sigma based on (Equation 3):

$$temporalSigma = \sqrt{\max(0.0f, accumulatedSecondMoment - accumulatedFirstMoment * accumulatedFirstMoment)}$$

where the accumulated FirstMoment (or first moment) would be the average of the accumulated luminance values of a specific pixel over a certain period of time, and the accumulatedSecondMoment (or second moment) would be the average of the squared deviations of the accumulated pixel values of a specific pixel from its temporal mean value (i.e., first moment).

In some embodiments, the reset circuit 226 can determine the spatial sigma based on (Equation 4):

$$spatialSigma = \sqrt{\max(0.0f, spatialSecondMoment - spatialFirstMoment * spatialFirstMoment)}$$

where the spatialFirstMoment (or first moment) would be the average of the accumulated pixel values over a certain spatial region (e.g., within a 3×3 pixel block, within a 5×5 pixel block, within a 7×7 pixel block, etc.), and the spatialSecondMoment (or second moment) would be the average of the squared deviations of the accumulated pixel values from its spatial mean value.

Additionally, the standard deviations can be used to determine the acceptable range of pixel values (Equation 5):

$$\text{range} = S * spatialSigma + T * temporalSigma \quad\quad 5$$

where S and T are parameters that define the denoiser's tolerance to spatial and temporal noise. The range can then be used to decide whether to keep or reset the history for a pixel in denoiser 130, based on whether the change in pixel values falls within this range.

As shown, the temporal and spatial characteristics of the accumulated luminance values are used to guide the behavior of denoiser 130. The denoiser computes the average and variance (i.e., first and second moments) of these values in both the temporal and spatial domains, and these statistical properties are then used to compute a range of acceptable pixel values. The reset circuit 226 can then manage the historically accumulated pixel values and data based on whether the changes in pixel value (e.g., luminance, color space, chrominance) fall within this range.

For example, for a particular pixel over 10 frames of video, the temporal accumulator system 210 can collect the luminance values of this pixel across the 10 frames and calculate the first moment (i.e., mean) and second moment (i.e., mean of the squares of the values). In this example, the temporal variance can be determined by subtracting the square of the first moment from the second moment. The square root of this variance provides the reset circuit 226 the temporal standard deviation, or temporalSigma. In this example, when the reset circuit 226 analyzes a 5×5 area (or 3×3, 10×10, etc., shown with reference to FIG. 18) of pixels surrounding the particular pixel of interest in the current frame, the first moment (i.e., mean) and second moment (i.e., mean of the squares) of these values can be determined or calculated. In this example, the square root of this variance provides the spatial standard deviation, or spatialSigma. Still referring to this example, if S=2, T=1, spatialSigma=0.05, and temporalSigma=0.02. The range determine by the reset circuit 226 would be:

$$\text{range} = S * spatialSigma + T * temporalSigma$$
$$= 2 * 0.05 + 1 * 0.02$$
$$= 0.102$$

This calculated range could then be used by the reset circuit 226 to determine whether the signal change for the given pixel is tolerable, or whether the history should be reset. If the change in pixel value (e.g., luminance, color space) falls within this range, the reset circuit 226 can tolerate the change and maintain the history. Otherwise, the history would be reset. In some embodiments, the amount of the historical reset can be determined (or calculated) based on a difference between the accumulated and input signal pixel values and the tolerance range determined from the spatial and temporal variances. In some embodiments, the reset circuit 226 can calculate the amount of history reset based on the difference between accumulated and input signal luminance (or another pixel value) and the tolerance range. This can be defined by (Equation 6a):

$$historyResetAmount = $$
$$A * \frac{\max(0, \text{abs}(accumulatedL - noisyInputL) - \text{range})}{(accumulatedL + \text{range})}$$

where parameter A, which lies in the range from 0 to 1, provides the desired responsiveness of the denoiser, accumulatedL is the accumulated luminance or brightness (sometimes the accumulated pixel color value), which is a measure of the average pixel values of a specific pixel in the history buffer over a certain period of time or number of frames, and noisyInputL is the luminance value (sometimes the accumulated pixel color value) of the current noisy input frame at the same pixel position, representing the brightness of the most recent frame.

Additionally, Equation 6a could also be defined as:

$$historyResetAmount = A * \text{ratio}$$

where ratio is (Equation 6b):

$$\text{ratio} = \frac{\max(0, |L_a - L_{i|-r)})}{L_a + r}$$

where $L_a$ is the accumulated luminance, $L_i$ is the luminance value of the current noisy input, and r is the range determined from Equation 5.

In one example, for a given pixel, and over a set of previous frames, assume the accumulated luminance (accumulatedL) at this pixel position has been determined to be 0.75 (on a scale of 0 to 1, where 1 represents full brightness and 0 represents no brightness). Now, assume that the luminance for the current noisy input frame (noisyInputL) at this same pixel is 0.80. Additionally, for this example, assume that the calculated tolerance range (range) from the spatial and temporal variances of the pixel is 0.05. Lastly, assume the reset circuit 226 defines the desired responsiveness of the denoiser, as 0.5 (e.g., on a scale of 0 to 1). The amount of history reset (historyResetAmount) can be calculated as follows:

$$historyResetAmount = 0.5 * \frac{\max(0, \text{abs}(0.75 - 0.80) - 0.05)}{(0.75 + 0.05)}$$

Calculating the absolute difference between accumulatedL and noisyInputL gives 0.05, which is the same as the range. Therefore, the equation becomes:

$$historyResetAmount = 0.5 * \frac{\max(0, 0)}{(0.75 + 0.05)} = 0$$

In this example, no history reset is needed because the difference in luminance values between the accumulated and the current noisy input (e.g., input signal 201) falls within the defined tolerance range (i.e., within 0.05). The reset circuit 226 can thus maintain the history buffer for this pixel without needing to adjust it for the current frame.

In another example, for a given pixel, the accumulatedL can be 0.75 and the desired denoiser responsiveness (A) can be 0.5. But in this example, assume that the luminance for the current noisy input frame (noisyInputL) at the same pixel is 0.90. Additionally, for this example, assume that the calculated tolerance range (range) from the spatial and temporal variances of the pixel is 0.05. The amount of history reset (historyResetAmount) can be calculated as follows:

$$historyResetAmount = 0.5 * \frac{\max(0, \text{abs}(0.75 - 0.90) - 0.05)}{(0.75 + 0.05)}$$

Calculating the absolute difference between accumulatedL and noisyInputL gives 0.15, and subtracting the range gives 0.1. Therefore, the equation becomes:

$$historyResetAmount = 0.5 * \frac{\max(0, 0.1)}{(0.75 + 0.05)} = 0.0625$$

In this example, history reset is needed because the difference in luminance values between the accumulated and the current noisy input exceeds the defined tolerance range. The reset circuit 226, therefore, needs to reset the history buffer for this pixel by a factor of 0.0625 to adjust it for the current frame.

In some embodiments, the historical reset amount can be determined using RGB values instead of luminance value. This can be defined by (Equations 6c, 6d, and 6e, respectively) where the range would be determined using RGB values:

$$historyResetAmountR = \\ A * \frac{\max(0, \text{abs}(accumulatedR - noisyInputR) - \text{range})}{(accumulatedR + \text{range})}$$

$$historyResetAmountG = \\ A * \frac{\max(0, \text{abs}(accumulatedG - noisyInputG) - \text{range})}{(accumulatedG + \text{range})}$$

$$historyResetAmountB = \\ A * \frac{\max(0, \text{abs}(accumulatedB - noisyInputB) - \text{range})}{(accumulatedB + \text{range})}$$

In some embodiments, the reset circuit 226 can use the historyResetAmount to pull the accumulated history (and the responsive history) towards the raw noisy input. The lerp function, short for linear interpolation, can be used for this purpose. This function can be used to determine a value that is a certain percentage (the history reset amount) between the accumulated history and the raw noisy input (Equation 7):

$$\text{output} = lerp(accumulated, noisyInput, historyResetAmount)$$

where the lerp function can be used by the reset circuit 226 to blend the accumulated history with the raw noisy input using the history reset amount as the blend factor. This results in a new output which takes into account the accumulated history, while also responding to the current noisy input. This output is then fed as input for the temporal accumulation stage for the next frame (e.g., as responsive history output 203 or normal history output 202), updating the denoiser 130 with the new information. In some embodiments, the output can be for a particular color component (e.g., the R component of RGB).

It should be understood that this model or steps can be implemented out for each frame, ensuring that the denoiser 130 is continually updated and responding to the most current information. This results in a denoiser architecture that is dynamic and efficient and also capable of adapting to changing lighting conditions in real-time. Accordingly, the reset circuit 226 improves denoiser architecture flexibility and usefulness for a wide range of light transport simulation techniques with different noise properties, which is an improvement to the field of image and video processing. Additional information regarding the acceleration process and the implementation of the acceleration circuit 222 are described in greater detail with reference to FIGS. 10A-10B.

Spatial filter system 230 can be configured to enhance the image quality and provide a smoother transition between frames during light transport simulation (e.g., ray-tracing). Applying a certain degree of blur or spatial filtering to dynamic scenes, such as using Gaussian blur, can aid in delivering more natural motion in image sequences, reducing the presence of spatial sampling bias, and mitigating artifacts like noise or flickering. In general, the spatial filterer system 230 receives accelerated, clamped, or reset normal history frames from the acceleration circuit 222, clamping circuit 224, and reset circuit 226, respectively. With filtering techniques, the spatial filterer system 230 processes these history frames, introducing appropriate modifications to enhance the image quality. Subsequently, these processed frames can undergo a spatial filtering procedure. This allows the spatial filter system 230 to diminish problems such as noise, flickering, and other visual inconsistencies that could detract from the overall viewing experience.

In some embodiments, the spatial filter system 230 can determine the appropriate amount of blur to apply, thereby ensuring the outputted images retain their sharpness and exhibit more natural motion. For example, the spatial filterer system 230 can apply varying degrees of blur to different sections of an image based on their respective motion properties. Upon completion of the spatial filtering process, the spatial filterer system 230 outputs the signal that has been refined by denoiser 130. This output, shown as the denoised output 204, is then ready to be displayed (e.g., on display 140). For example, when the spatial filterer system 230 receives a history frame from the history system 220 that contains noise, it can apply an A-Trous wavelet filtering technique to this input. The filtering technique allows the spatial filterer system 230 to process the noisy input and produce a clearer, denoised output 204 as part of the operations of the denoiser 130.

History Acceleration

Referring now to FIGS. 3-9, examples depicting the historical acceleration of accumulated history buffers, according to some embodiments. In general, rapid changes in lighting conditions—such as in gaming scenarios where a player's actions result in abrupt fluctuations, like gunfire, explosions, or moving light sources like fireballs—demand a more responsive denoiser. In some embodiments, both the normal and responsive histories begin the process of moving towards the new color space result at different rates. For example, the normal history can transition at a slower pace, while the responsive history moves at a more accelerated rate. The acceleration circuit 222 can determine the per-pixel distance in color space between the normal and responsive history. This distance can then be added to both histories with a constant scaling factor k applied, which defines the amount of history acceleration. Accordingly, both histories are enabled to converge to new results at an increased speed.

Figure 3:
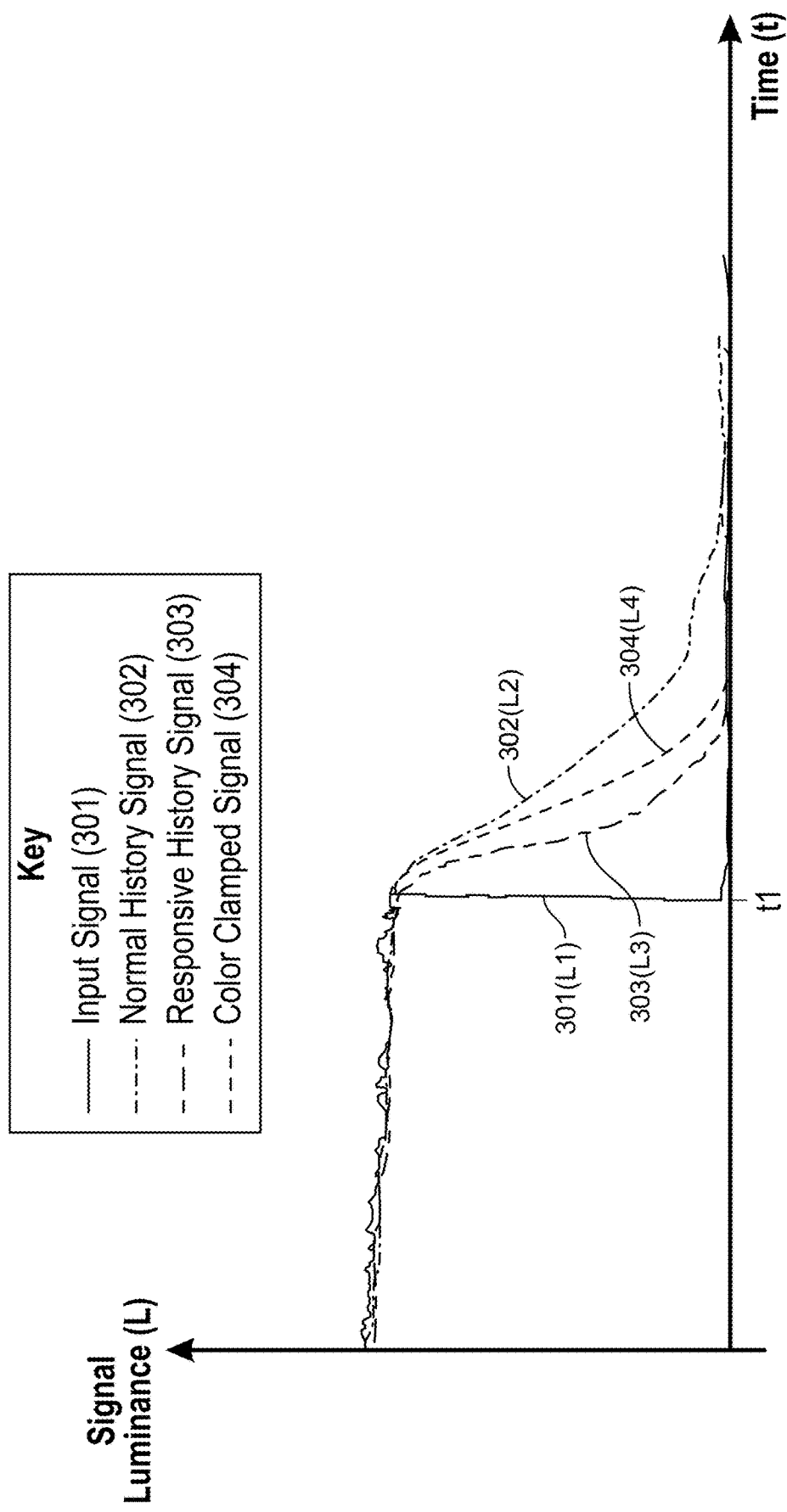
FIGS. 3-9 are illustrative examples depicting historical acceleration of accumulated history buffers, according to one or more embodiments.

Referring now to FIG. 3, an example illustration of pixel values across multiple frames is shown, in accordance with certain embodiments. The X-axis represents time, while the Y-axis denotes signal luminance. As shown, incoming input signal 301, denoted as input data L1, or raw data, experiences a sudden change in light at point t1, where the lighting is reduced to zero. At this juncture, normal history 302, also referred to as input data L2, is integrated into the denoiser 130. This data is temporally accumulated, leading to a smoother output. However, as the lighting alters, the normal history 302 follows the change in the input signal 301, but not abruptly. This is because the new noisy data, input signal 301, can be assigned specific weights by the temporal accumulator system 210, providing a gradual descent in response to the change in lighting. Additionally, the responsive history 303, classified as input data L3, can be introduced to the denoiser. As shown, the responsive history converges to the new input signal value more rapidly than the normal history 302. When color clamping, denoted as input data L4, is utilized, the color clamping signal 304 can draw the normal history 302 closer to the curvature of the responsive history 303. However, these responses alone are insufficient. The ideal scenario is for the system to mirror the abrupt lighting changes as closely as possible, as seen in input data L1.

Figure 4:
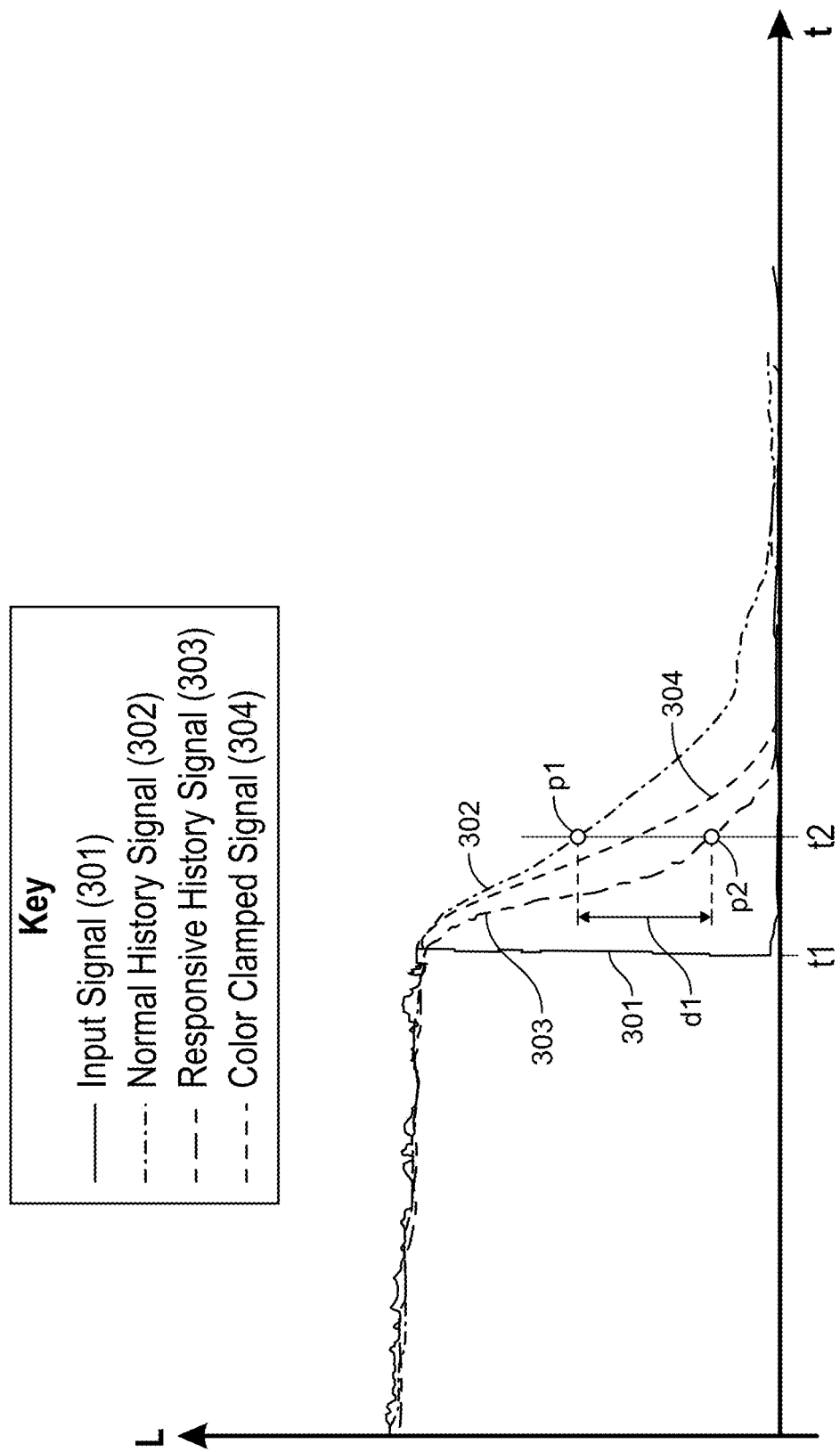

Referring now to FIG. 4, an example illustration of pixel values across multiple frames is shown, in accordance with certain embodiments. When lighting conditions change dramatically, such as a ray traced light toggling on or off, the normal and responsive histories start converging towards the new result in the color space at different speeds. As demonstrated in FIG. 4, a difference d1 exists between point p1 of the normal history 302 and point p2 of the responsive history 303, both points representing a specific moment at time t2, such as a frame. The pixel value at these points can be or represent, for example, a luminance value. To illustrate with actual numbers, assume the luminance of the normal history 302 (p1) is 200 cd/m² and the responsive history 303 (p2) is 50 cd/m² at the time when a light source is switched off. The difference d1, in this case, is 150 cd/m². This difference d1 can be considered as a 3-component vector (e.g., RGB or YCoCg) and is multiplied by a scalar value k, which is passed to the denoiser and defines the amount of history acceleration. In some embodiments, all of the calculations can be performed within the color space.

Figure 5:
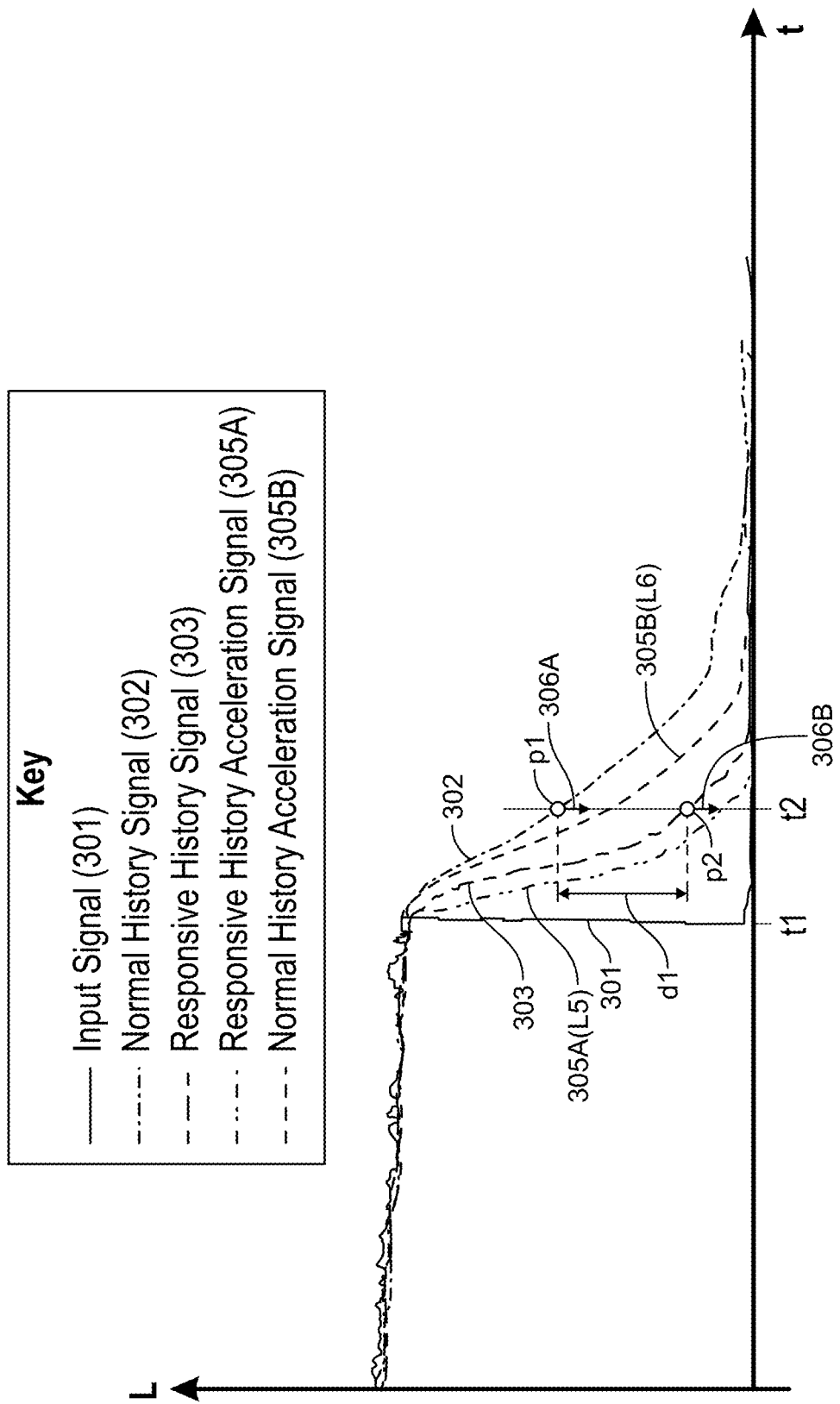

Referring now to FIG. 5, an example illustration of accelerated pixel values across multiple frames is shown, in accordance with certain embodiments. The calculated difference d1 is used to accelerate the convergence of both histories towards the new input data, as exemplified with responsive history acceleration signal 305A (L5) and normal history acceleration signal 305B (L6). For example, the pixel of the normal history 302 can be adjusted by the calculated difference d1 multiplied by the scalar k, assuming k=0.1. As shown, this shifts the luminance value of the normal history 302 by 15 cd/m² (i.e., 150 cd/m²*0.1), accelerating its convergence to the new input signal value. It should be understood that the application of color clamping can be implemented by clamping circuit 224, but the overall result is an improved convergence to the settled point.

Referring to both FIGS. 4 and 5, considering a scenario with pixel values expressed in terms of RGB color space, in accordance with certain embodiments. Suppose at time t2, the normal history 302 and responsive history 303 have RGB values of (200, 200, 200) and (50, 50, 50) respectively, right after a ray traced light source has been turned off. The difference d1 between these points would be (150, 150, 150). To accelerate the histories towards the new result, this difference is multiplied by a scalar value k (assuming k=0.1), resulting in an adjustment of (15, 15, 15). This adjustment is then added to both the normal and responsive histories, driving their RGB values closer to the new input signal. For example, the RGB value of the normal history 302 would be adjusted to (185, 185, 185), thereby accelerating the convergence of both histories to the new RGB value faster. The same calculation and adjustment process applies to the responsive history 303.

Figure 6:
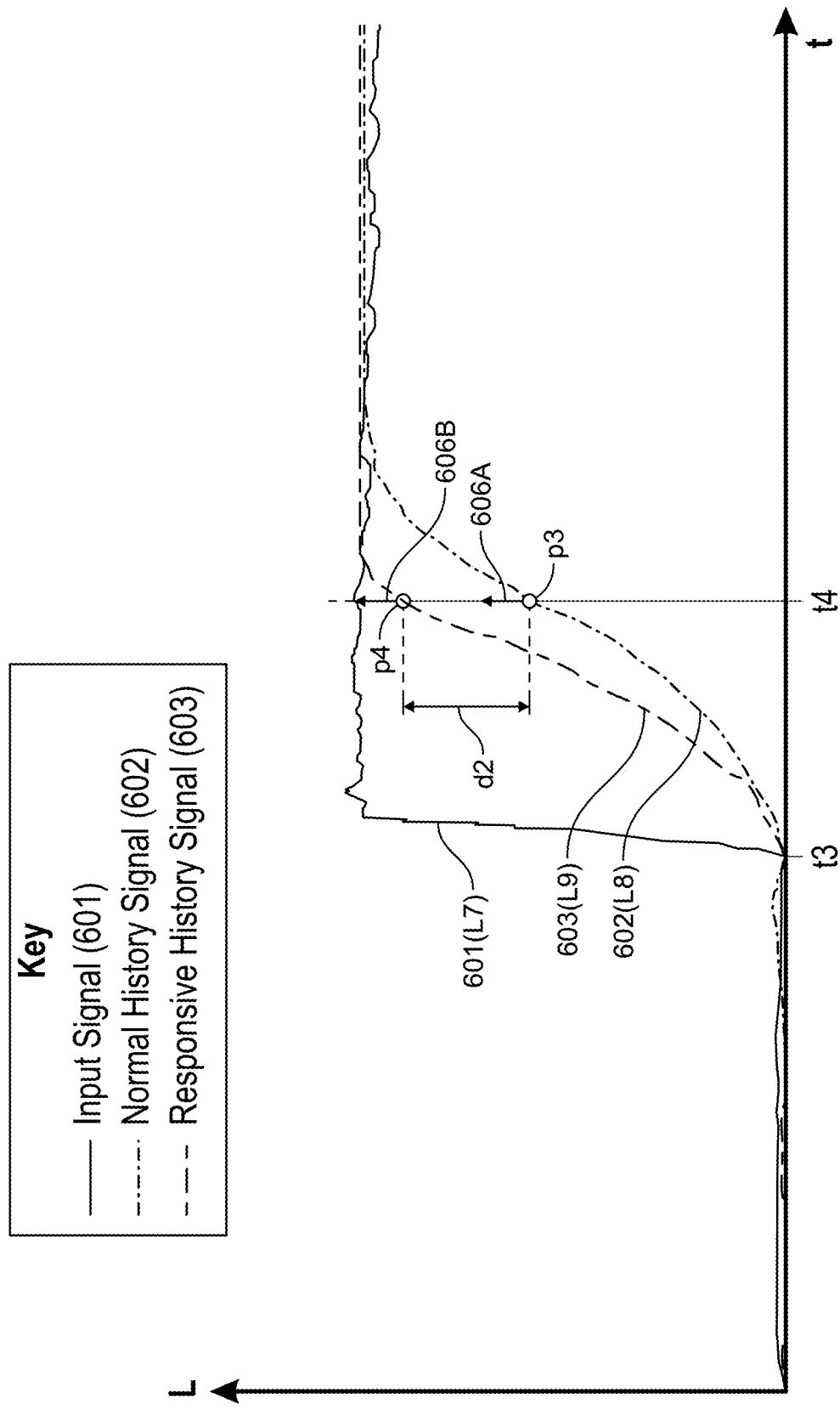

Referring now to FIG. 6, an example illustration of pixel values across multiple frames is shown, in accordance with certain embodiments. For example, if the input luminance signal 601 (L7) increases abruptly at time t3 due to a light source being toggled on, the normal history 602 (L8) and the responsive history 603 (L9) begin converging towards this new input signal value. As an illustrative example, assume the luminance value of the input signal changing from 10 cd/m² to 200 cd/m². At time t4, the normal history could be at a luminance value of 120 cd/m², whereas the responsive history could be at a luminance value of 180 cd/m². This creates a difference, d2 (between P3 and p4), of 60 cd/m² in the luminance value.

Figure 7:
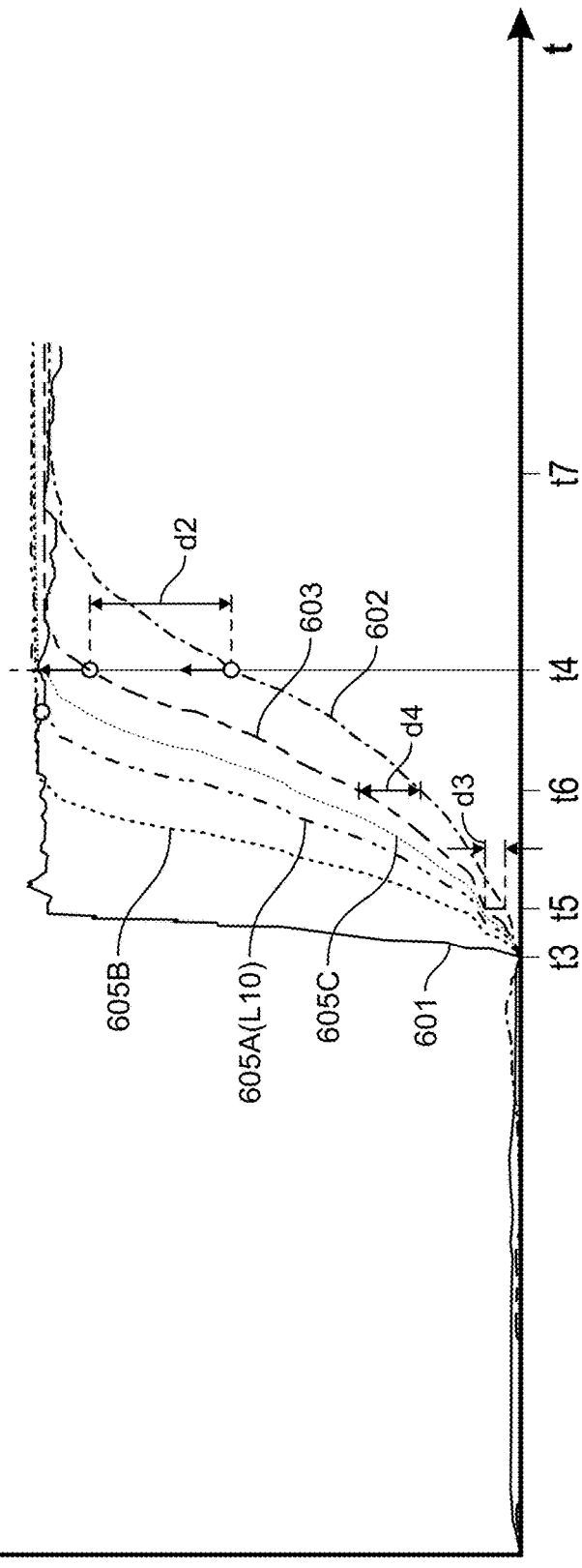

Referring now to FIG. 7, an example illustration of pixel values across multiple frames is shown, in accordance with certain embodiments. It should be understood that the historical acceleration only utilizes temporally accumulated signals (L8 and L9), hence preventing the introduction of any additional noise, as would be the case if it directly relied on the raw data (L7). Differences d3, d4, and d5, calculated at different points in time (t5, t6, t7), can be determined to accelerate the frame history at the given pixel. For example, the acceleration signal 605A (L10) could be history acceleration from a medium scaling factor, k=0.5, 605B from a larger scaling factor, k=0.7, and 605C from a smaller scaling factor, k=0.3.

Figure 8:
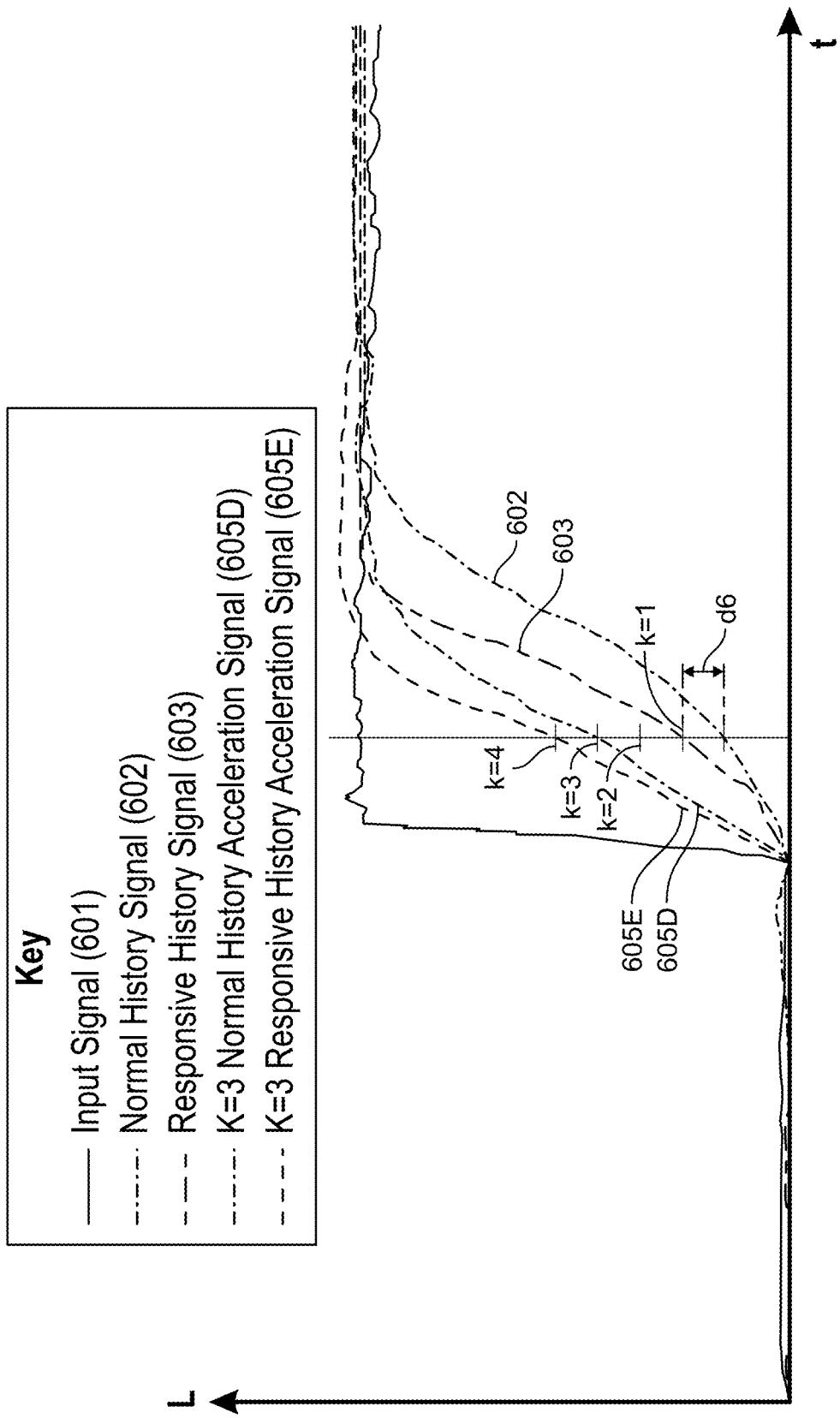

Referring now to FIG. 8, an example illustration of pixel values across multiple frames is shown, in accordance with certain embodiments. As shown, consider the acceleration circuit 222 selects a scaling factor k value of 3 to adjust the convergence speed of the histories. Using this selection, the normal history acceleration signal 605D and the responsive history acceleration signal 605E are influenced. By incorporating the calculated difference (e.g., d6=20 cd/m²) into the histories with a scaling factor of 3, both the normal history and responsive history are accelerated. This can be observed as an increased steepness in their respective curves towards the new input signal value. The normal history acceleration signal 605D can increase to a value of 30 cd/m²+(3*20 cd/m²)=90 cd/m², while the responsive history acceleration signal 605E could advance to a value of 50 cd/m²+(3*20 cd/m²)=110 cd/m². This accelerated approach allows both the histories to respond more rapidly and accurately to the drastic change in the input signal, increasing the overall responsiveness of the denoising system.

Figure 9:
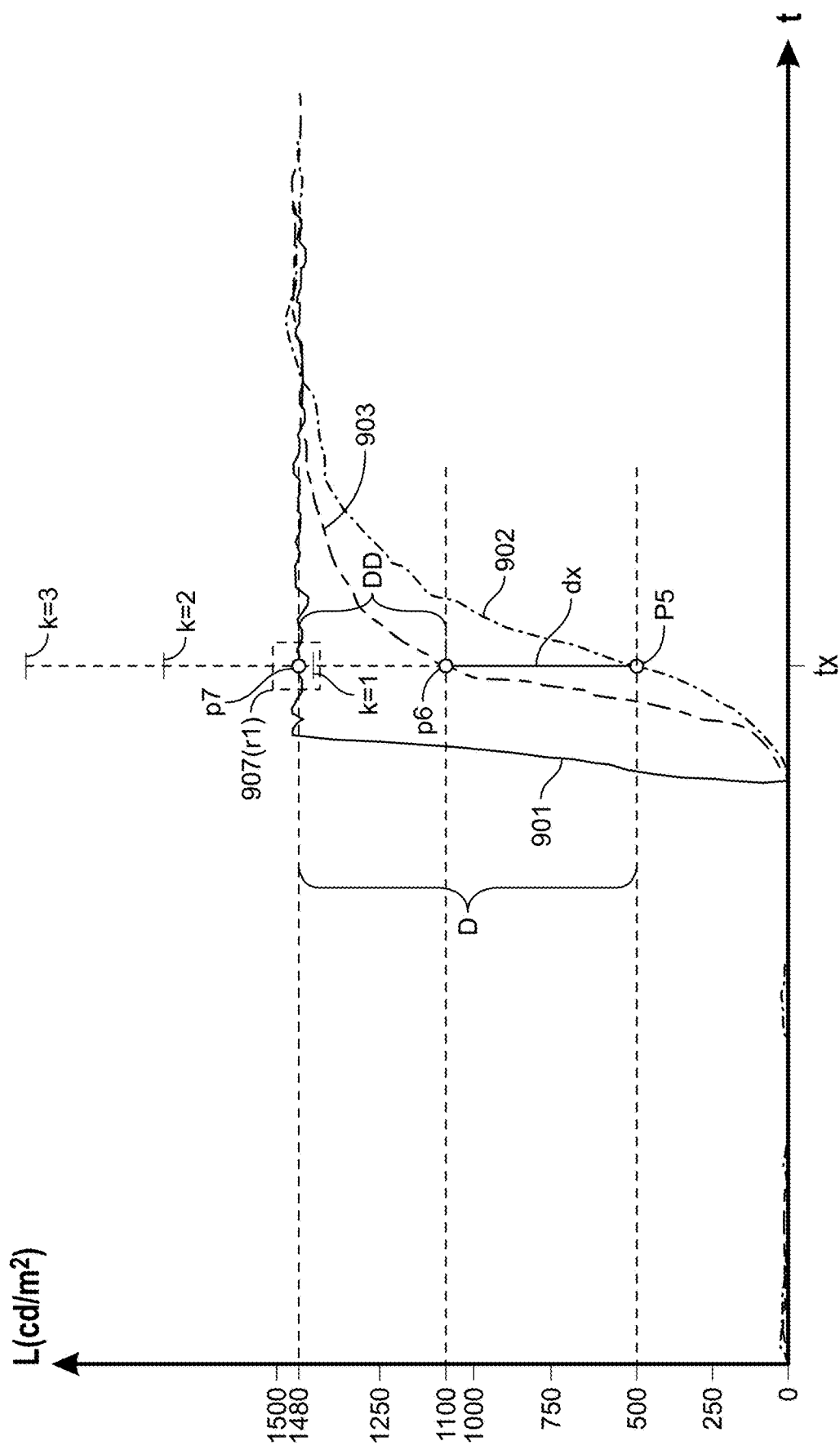

Referring now to FIG. 9, an example illustration of pixel values across multiple frames is shown, in accordance with certain embodiments. In one illustrative example, assume the luminance of the normal history 902 ($L_{normal}$ at point p5) at a given pixel location X equals 500 cd/m², and the luminance of the responsive history 903 ($L_{responsive}$ at point p6) at the same pixel location X amounts to 1100 cd/m². Additionally, assume the luminance of the noisy input signal 901 ($L_{noisy}$ at point p7) measures 1480 cd/m^2. In this example, the acceleration circuit 222 can determine the acceleration amount by determining the difference (dx) between the luminance of the responsive history 903 and the normal history 902 (i.e., Acceleration$_{amount}$=L$_{responsive}$-L$_{normal}$=1100 cd/m²-500 cd/m², thereby yielding 600 cd/m², assuming the scaling factor (k) is one). Additionally, as shown, a pixel region (r1) of 5×5 (also shown with reference to pixel region 1800 of FIG. 18). To further decrease the potential increase of noise at the denoiser output, the noisy input signal 901 can be averaged over a 5×5 pixel area.

However, to ensure the stability of the denoiser output, different adjustments might be required for the normal and responsive history buffers to prevent overshooting. To determine the appropriate adjustments, the acceleration circuit 222 can determine the distance in luminance between each history buffer and the noisy input signal. For the responsive history buffer (shown as distance DD in FIG. 9):

$$DistanceToNoisyInputL_{responsive} = L_{noisy} - L_{responsive}$$
$$= 1480 \text{ cd/m}^2 - 1100 \text{ cd/m}^2 = 380 \text{ cd/m}^2$$

For the normal history buffer (shown as distance D in FIG. 9):

$$DistanceToNoisyInputL_{normal} = L_{noisy} - L_{normal}$$
$$= 1480 \text{ cd/m}^2 - 500 \text{ cd/m}^2 = 980 \text{ cd/m}^2$$

In some embodiments, the ratio of these distances to the acceleration amount can then calculated for each history buffer:

$$AccelerationRatio_{responsive} = \frac{DistanceToNoisyInputL_{responsive}}{Acceleration_{amount}} = \frac{80 \text{ cd/m}^2}{600 \text{ cd/m}^2} = 0.63$$

$$AccelerationRatio_{normal} = \frac{DistanceToNoisyInputL_{normal}}{Acceleration_{amount}} = \frac{980 \text{ cd/m}^2}{600 \text{ cd/m}^2} = 1.63$$

Accordingly, if either ratio is less than 1.0, it indicates that the acceleration would lead to overshooting. In this example, AccelerationRatio$_{responsive}$ is less than 1.0, indicating that the acceleration circuit 222 should adjust the acceleration amount for the responsive history buffer. In some embodiments, the adjustment can be made by multiplying the acceleration amount with the ratio to prevent overshooting the noisy input signal luminance. In some embodiments, the adjustment can be made by reducing the acceleration amount to the distance to the noisy input signal (i.e., in this example it would be 1480 cd/m²). Using the multiplication process, the adjusted acceleration amount for the responsive history buffer is then:

$$AdjustedAcceleration_{responsive} = Acceleration_{amount} * AccelerationRatio_{responsive}$$
$$= 600 \text{ cd/m}^2 * 0.63 = 378 \text{ cd/m}^2$$

Additionally, the adjusted acceleration amount for the normal history buffer doesn't need to be adjusted as its ratio is above 1.0. This means the original acceleration won't lead to overshooting. In some embodiments, if the ratio for at least one of the determinations is less 1.0, both the responsive and normal history buffer can be adjusted by the adjusted acceleration amount of the history buffer with the ratio below 1.0 (e.g., in this example both the responsive and normal history acceleration adjustment would be 378 cd/m²).

For the implementation of color values in the RGB (Red, Green, Blue) color space, consider the following illustrative example as shown in FIG. 9. In this example, assume the color values of the normal history buffer 902 (C$_{normal}$ at point p5) and responsive history buffer 903 (C$_{responsive}$ at point p6) at a given pixel location X are RGB (50, 100, 150) and RGB (110, 220, 330), respectively. The color of the noisy input signal 901 (C$_{noisy}$ at point p7) is assumed to be RGB (148, 296, 444). The acceleration amount in this case is the color difference vector from the normal history buffer to the responsive history buffer, i.e., ΔC=C$_{responsive}$-C$_{normal}$=RGB(60, 120, 180). This RGB vector represents the directional force the responsive history buffer uses to update its value.

To prevent overshooting, the acceleration circuit 222 calculates the RGB color space distances between each history buffer and the noisy input signal. For the responsive history buffer, the color distance (DD in FIG. 9) can be calculated as:

$$D_{responsive} = C_{noisy} - C_{responsive} = RGB(38,76,114)$$

And for the normal history buffer (distance D in FIG. 9), the color distance is:

$$D_{normal} = C_{noisy} - C_{normal} = RGB(98, 196, 294)$$

In both calculations, the acceleration circuit 222 can maintain the correspondence of color channels for the accuracy of color distance measurement. Next, the acceleration circuit 222 can calculate the ratio of these distances to the magnitude of the acceleration amount for each history buffer. If the ratio for any color channel is less than 1.0, it indicates potential overshooting. In such a scenario, the acceleration amount for that color channel should be adjusted by multiplying it with the ratio to prevent overshooting the noisy input color value. If the ratio for any color channel in the normal history buffer is less than 1.0, the corresponding color channel in the responsive history buffer is also adjusted.

For example, if AccelerationRatio$_{responsive}$ for the green channel is 0.63 (i.e., the ratio is less than 1.0), the green channel's acceleration amount can adjusted as follows:

$$AdjustedAcceleration_{GreenResp} = Green_{Acceleration_{amount}} * AccelerationRatio_{GreenResp}$$
$$= 120 * 0.63 = 75.6$$

In this manner, the acceleration amounts can be independently adjusted for each color channel in the RGB color space. These adjustments maintain the stability of the denoiser output, prevent overshooting, and preserve color fidelity, thus enhancing the performance and reliability of the denoiser 130. In the luminance and color space illustrative examples described in FIG. 9, the scaling factor k is assumed to be 1. Thus, the history acceleration, which is the difference between the responsive and normal history buffers, is calculated directly without any scaling. However, it is important to note that the scaling factor k can be different than 1 and could be applied to the acceleration amount when determining the appropriate adjustments. This means that the acceleration amount could be multiplied by the scaling factor k before it is used to calculate the ratio and adjust the acceleration of the respective history buffers.

History Reset

Figure 10A:
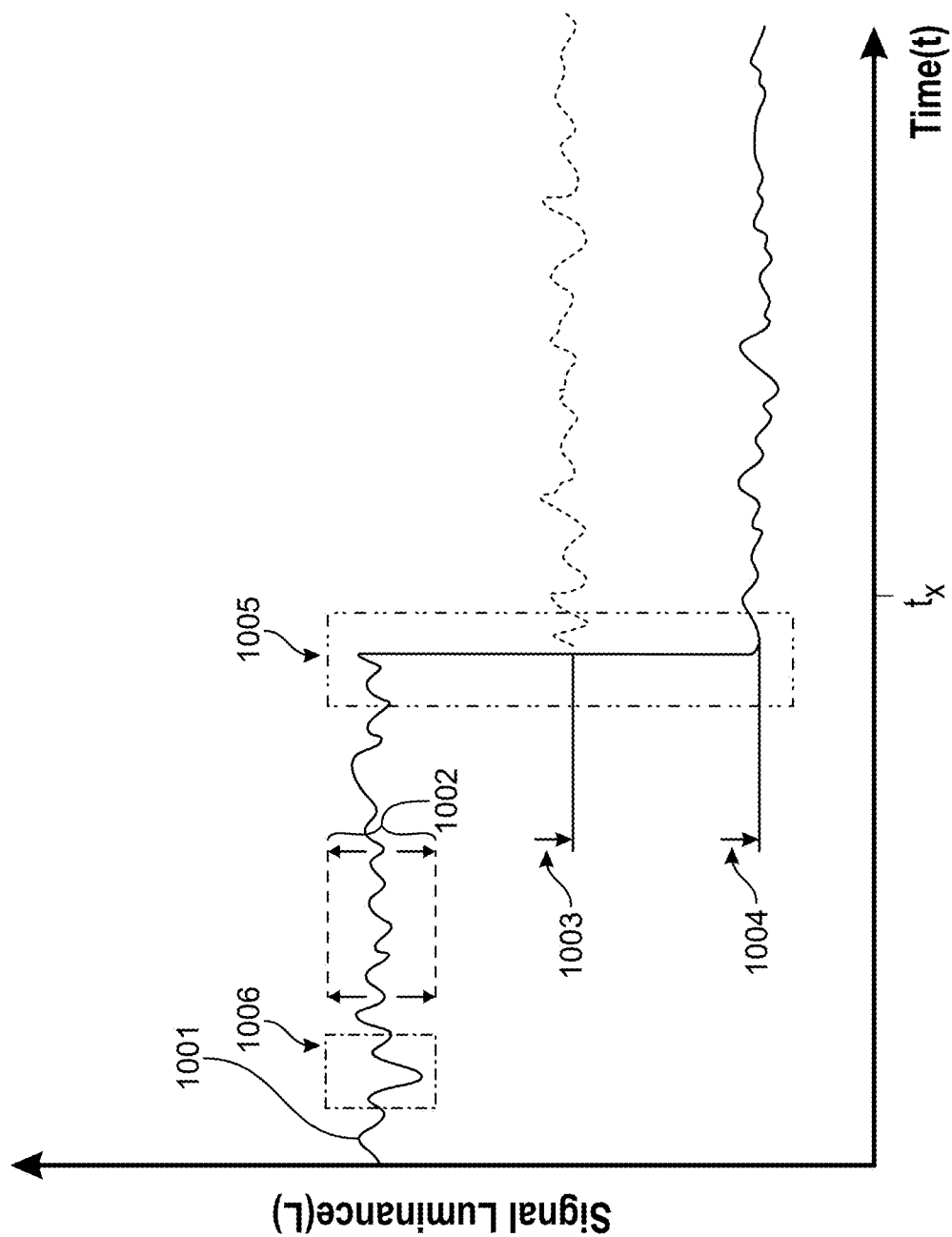
FIGS. 10A-10B are illustrative examples depicting historical reset of one or more accumulated history buffers, according to one or more embodiments.

Referring now to FIG. 10A, an example depicting historical reset of one or more accumulated history buffers, according to some embodiments. In general, FIG. 10A depicts an example of a noisy input signal 1001 that varies in luminance, specifically shifting from a high luminance value of around 200 cd/m$^2$ (candela per square meter) to a lower value of approximately 50 cd/m$^2$. Also shown is a determined tolerance range 1002. The determination of the tolerance range 1002 involves calculations of both temporal and spatial standard deviations (sigma) of the pixel values of accumulated history (e.g., responsive and normal) (as depicted in Equation 5). Temporal standard deviation represents fluctuations over time in a particular pixel's luminance, while spatial standard deviation represents the variability in luminance values across a defined set of pixels surrounding the pixel of interest. The tolerance range 1001 can then be calculated as a weighted sum of these standard deviations, with weights defined by parameters S and T, which reflect the denoiser's tolerance towards spatial and temporal noise, respectively. Thus, this tolerance range 1002 provides a spectrum of luminance values within which the reset circuit 226 can accept alterations in the input signal 1001 without resetting the accumulated history.

Moreover, the signal graph includes two segments or windows of the input signal 1001, labelled as window 1005 and window 1006. Window 1006 encases the noisy input signal 1001. Despite the presence of noise, the luminance values of the input signal 1001 stay within the boundaries of the calculated range 1002, thereby allowing the denoiser 130 to preserve the accumulated history. In some embodiments, the reset circuit 226 can identify when the fluctuations in the input signal's luminance (or pixel value) exceed the established range (e.g., window 1005). When such a scenario arises, the reset circuit 226 determines a ratio (Equation 6b) of the deviation from the range to measure the intensity of the change. For example, if the input signal's luminance goes outside the constraints of range 1002 and reaches a new value 1004 (in cd/m$^2$), the system calculates a ratio. This ratio amount is greater for luminance value 1004 compared to if the input signal extends only to new luminance value 1003 (in cd/m$^2$). In particular, the larger the ratio, the more significant the reset process that the denoiser will undertake, reflecting a larger shift in the input signal's luminance, as depicted in FIG. 10A.

Figure 10B:
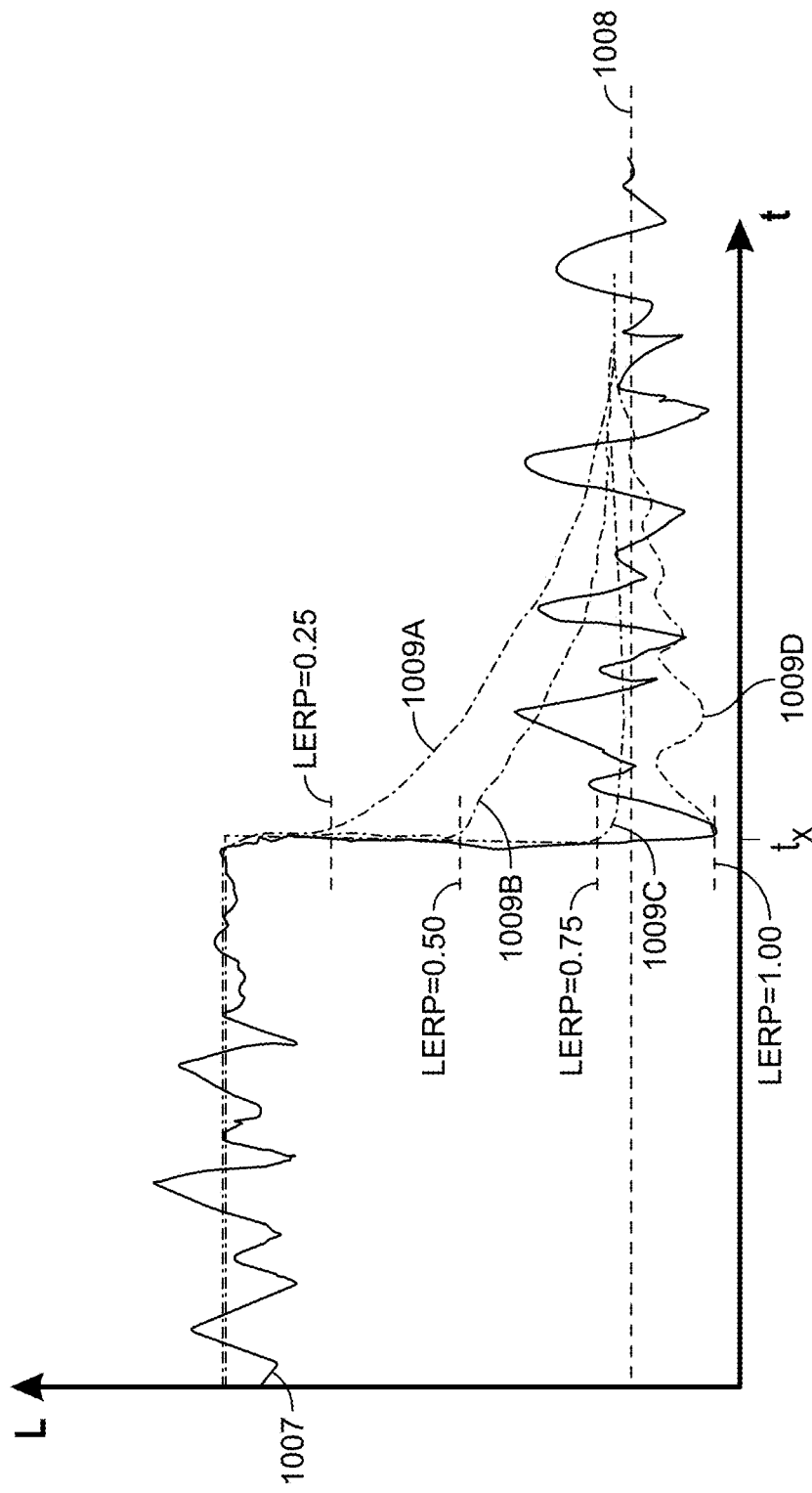

Referring now to FIG. 10B, an example depicting the historical reset of one or more accumulated history buffers, according to some embodiments. The reset history signals 1009A, 1009B, 1009C, and 1009D represent the state of the accumulated history buffer when the Linear Interpolation (LERP) values are set to 0.25, 0.50, 0.75, and 1.00, respectively. At a specific time point, denoted as $t_x$, when the LERP value is set to 1.00, it can be shown that the accumulated historical signal 1009D surpasses the level of the noisy input signal 1007. In particular, the mean value of the noisy input signal at this point would correspond to 1008, suggesting an overshoot scenario, which is generally undesirable as it can lead to misrepresentations in the data.

Additionally, the reset circuit 226, in certain implementations, may use the computed history reset amount (Equation 6a) to guide the accumulated history, as well as the responsive history, closer to the raw noisy input. For this purpose, the LERP function could be employed. The function computes a value that lies at a specified proportion (defined by history reset amount) between the accumulated history and the raw noisy input. In Equation 7, the LERP function is utilized by the reset circuit 226 to blend or merge the accumulated history with the raw noisy input, taking the history reset amount as the blending factor. Consequently, a new output is generated, which incorporates the information from the accumulated history while simultaneously responding to the most recent noisy input. This output then serves as the input for the temporal accumulation stage in the next frame. In some embodiments, the reset operation can be performed at each frame, and the resulting output can be fed back as input for the temporal accumulation stage for the subsequent frame. Accordingly, guided by the temporal and spatial variance, which are naturally determined by the properties of the input signal, the denoiser 130 performs history reset by monitoring changes in the input signal that exceed the calculated tolerance range.

Data Center

Figure 11:
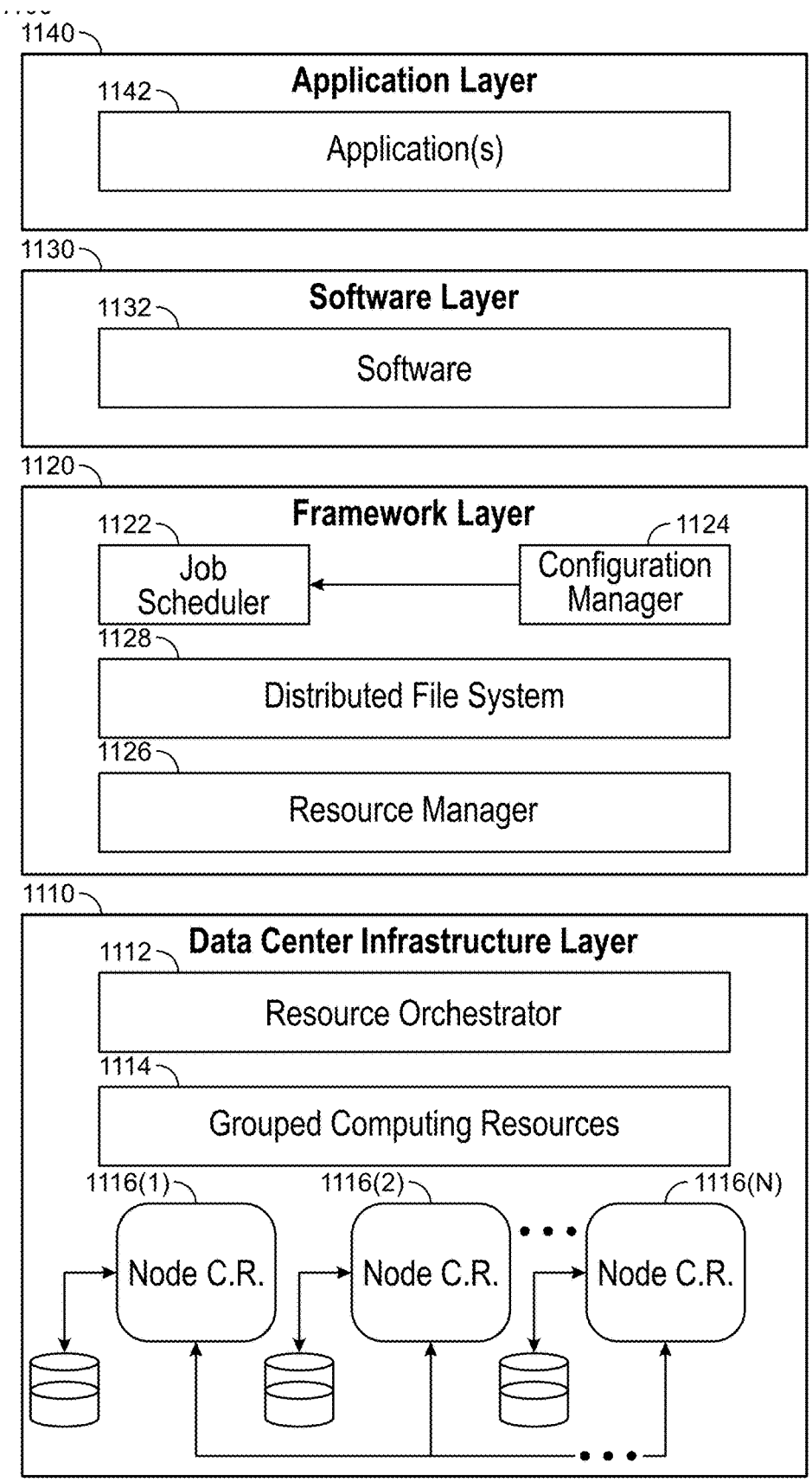
FIG. 11 is an example data center system, according to one or more embodiments.

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. The one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to improve image quality during image reconstruction using historical acceleration and/or historical reset.

Computer Systems

Figure 12:
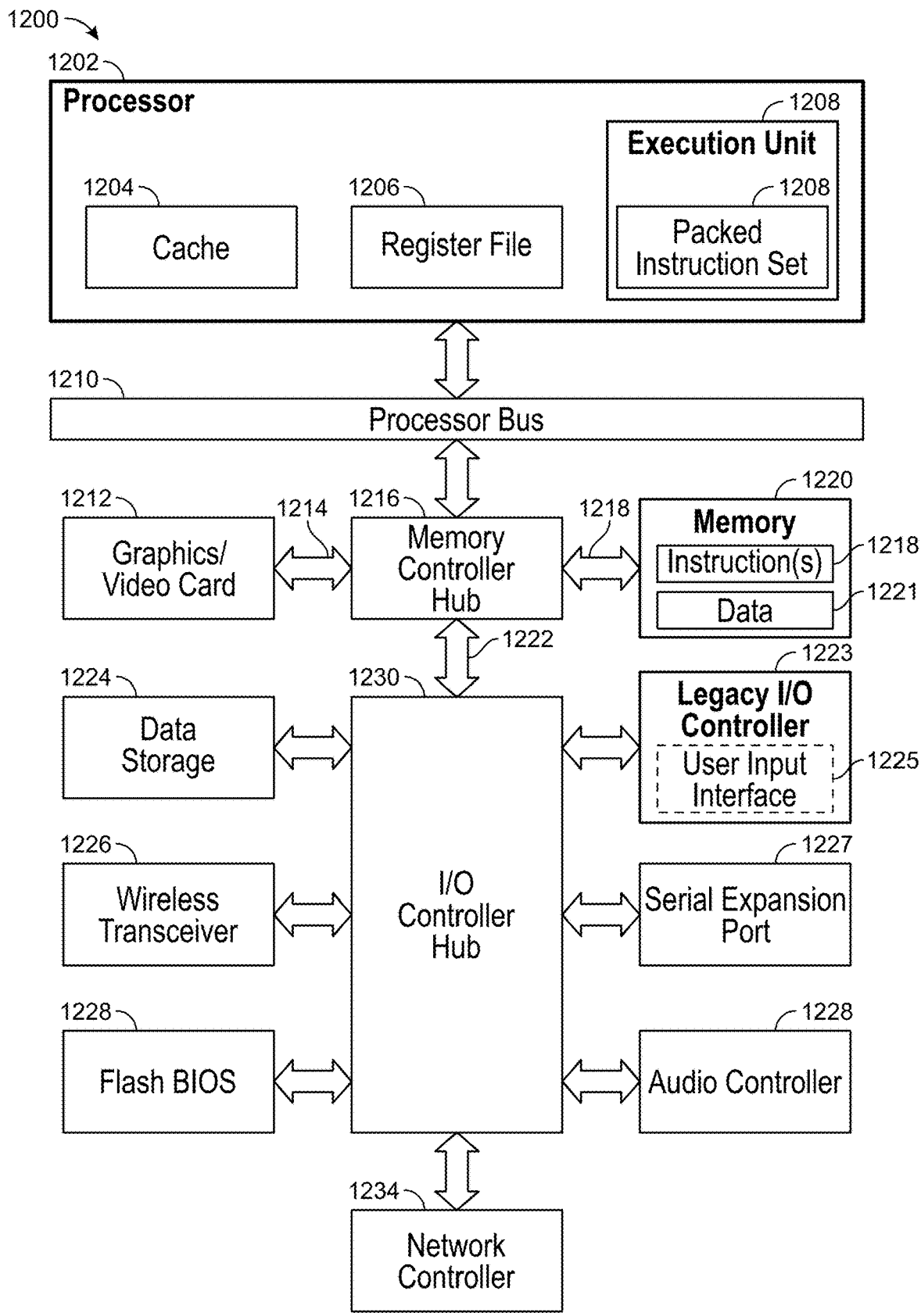
FIG. 12 is a computer system, according to one or more embodiments.

FIG. 12 is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, Intel® Nervana™, or Habana® Gaudi®2 and Habana® Greco™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234. Data storage 1224 may include a hard disk drive, a floppy disk drive, a CD-ROM device, a flash memory device, or other mass storage device.

In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1200 are interconnected using compute express link (CXL) interconnects.

Such components can be used to improve image quality during image reconstruction using historical acceleration and/or historical reset.

Figure 13:
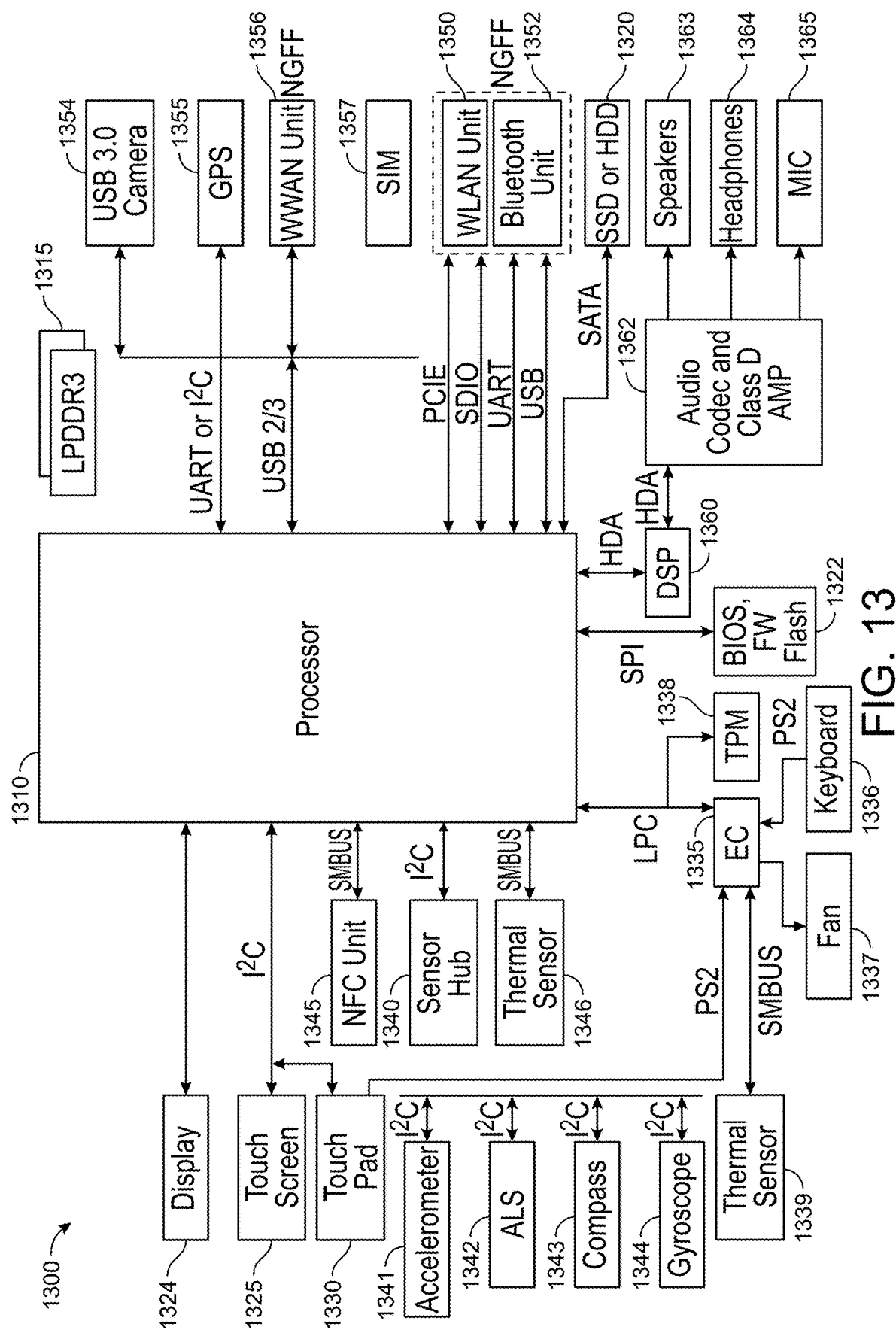
FIG. 13 is a computer system, according to one or more embodiments.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1346, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Such components can be used to improve image quality during image reconstruction using historical acceleration and/or historical reset.

Figure 14:
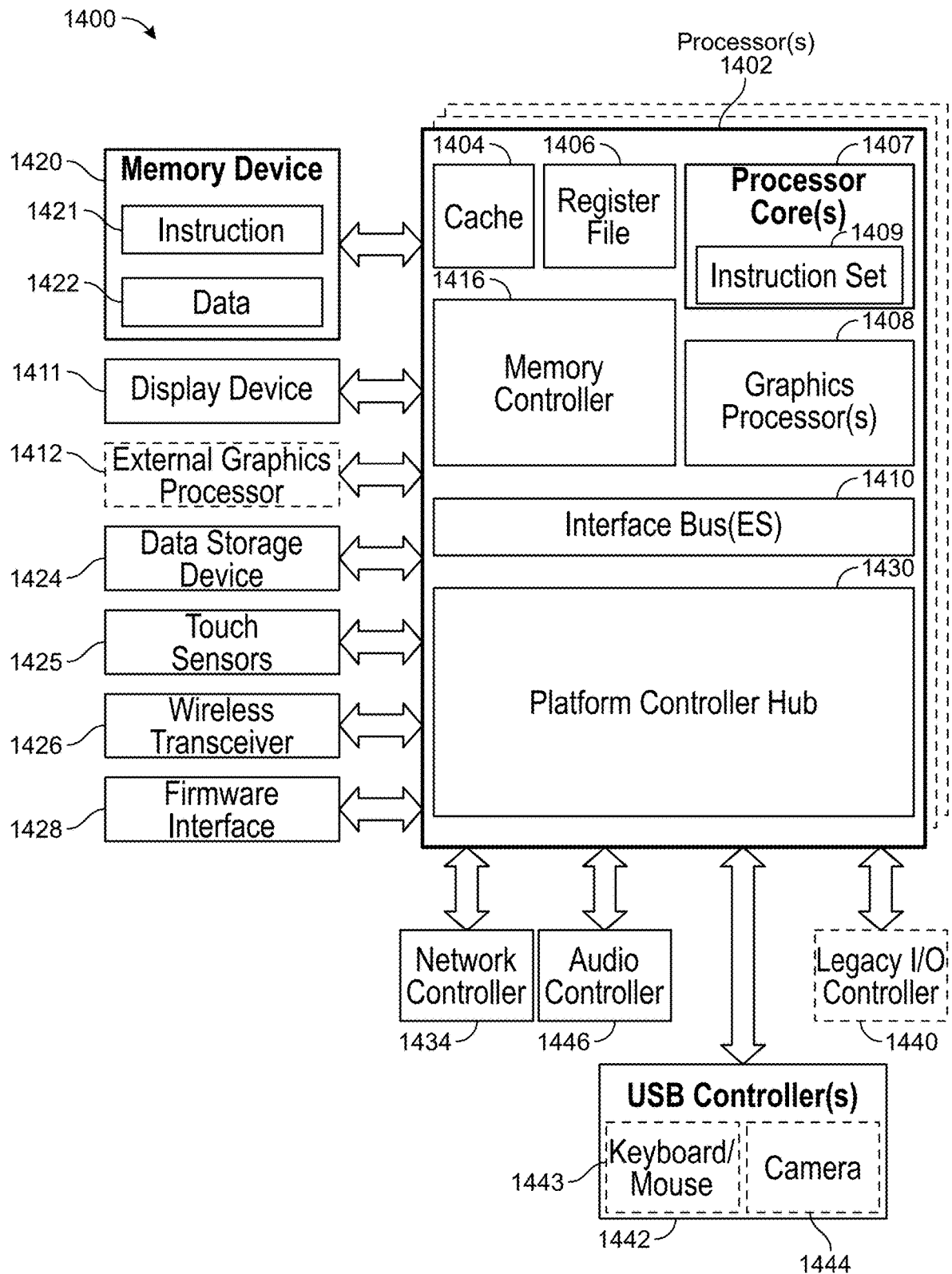
FIG. 14 is at least portions of a graphics processor, according to one or more embodiments.

FIG. 14 is a block diagram of a processing system, according to at least one embodiment. In at least one embodiment, system 1400 includes one or more processors 1402 and one or more graphics processors 1408, and may be a single processor desktop system, a multiprocessor workstation system, or a server system having a large number of processors 1402 or processor cores 1407. In at least one embodiment, system 1400 is a processing platform incorporated within a system-on-a-chip (SoC) integrated circuit for use in mobile, handheld, or embedded devices.

In at least one embodiment, system 1400 can include, or be incorporated within a server-based gaming platform, a game console, including a game and media console, a mobile gaming console, a handheld game console, or an online game console. In at least one embodiment, system 1400 is a mobile phone, smart phone, tablet computing device or mobile Internet device. In at least one embodiment, processing system 1400 can also include couple with, or be integrated within a wearable device, such as a smart watch wearable device, smart eyewear device, augmented reality device, or virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction set 1409, which may include instructions to facilitate emulation of other instruction sets. In at least one embodiment, processor core 1407 may also include other processing devices, such a Digital Signal Processor (DSP).

In at least one embodiment, processor 1402 includes cache memory 1404. In at least one embodiment, processor 1402 can have a single internal cache or multiple levels of internal cache. In at least one embodiment, cache memory is shared among various components of processor 1402. In at least one embodiment, processor 1402 also uses an external cache (e.g., a Level-3 (L3) cache or Last Level Cache (LLC)) (not shown), which may be shared among processor cores 1407 using known cache coherency techniques. In at least one embodiment, register file 1406 is additionally included in processor 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in system 1400. In at least one embodiment, interface bus 1410, in one embodiment, can be a processor bus, such as a version of a Direct Media Interface (DMI) bus. In at least one embodiment, interface 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub (PCH) 1430 provides connections to I/O devices via a local I/O bus.

In at least one embodiment, memory device 1420 can be a dynamic random access memory (DRAM) device, a static random access memory (SRAM) device, flash memory device, phase-change memory device, or some other memory device having suitable performance to serve as process memory. In at least one embodiment memory device 1420 can operate as system memory for system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 can connect to processor(s) 1402. In at least one embodiment display device 1411 can include one or more of an internal display device, as in a mobile electronic device or a laptop device or an external display device attached via a display interface (e.g., DisplayPort, etc.). In at least one embodiment, display device 1411 can include a head mounted display (HMD) such as a stereoscopic display device for use in virtual reality (VR) applications or augmented reality (AR) applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 can connect via a storage interface (e.g., SATA) or via a peripheral bus, such as a Peripheral Component Interconnect bus (e.g., PCI, PCI Express). In at least one embodiment, touch sensors 1425 can include touch screen sensors, pressure sensors, or fingerprint sensors. In at least one embodiment, wireless transceiver 1426 can be a Wi-Fi transceiver, a Bluetooth transceiver, or a mobile network transceiver such as a 3G, 4G, or Long Term Evolution (LTE) transceiver. In at least one embodiment, firmware interface 1428 enables communication with system firmware, and can be, for example, a unified extensible firmware interface (UEFI). In at least one embodiment, network controller 1434 can enable a network connection to a wired network. In at least one embodiment, a high-performance network controller (not shown) couples with interface bus 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system. In at least one embodiment, platform controller hub 1430 can also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, system 1400 can include an external memory controller 1416 and platform controller hub 1430, which may be configured as a memory controller hub and peripheral controller hub within a system chipset that is in communication with processor(s) 1402.

Such components can be used to improve image quality during image reconstruction using historical acceleration and/or historical reset.

Figure 15:
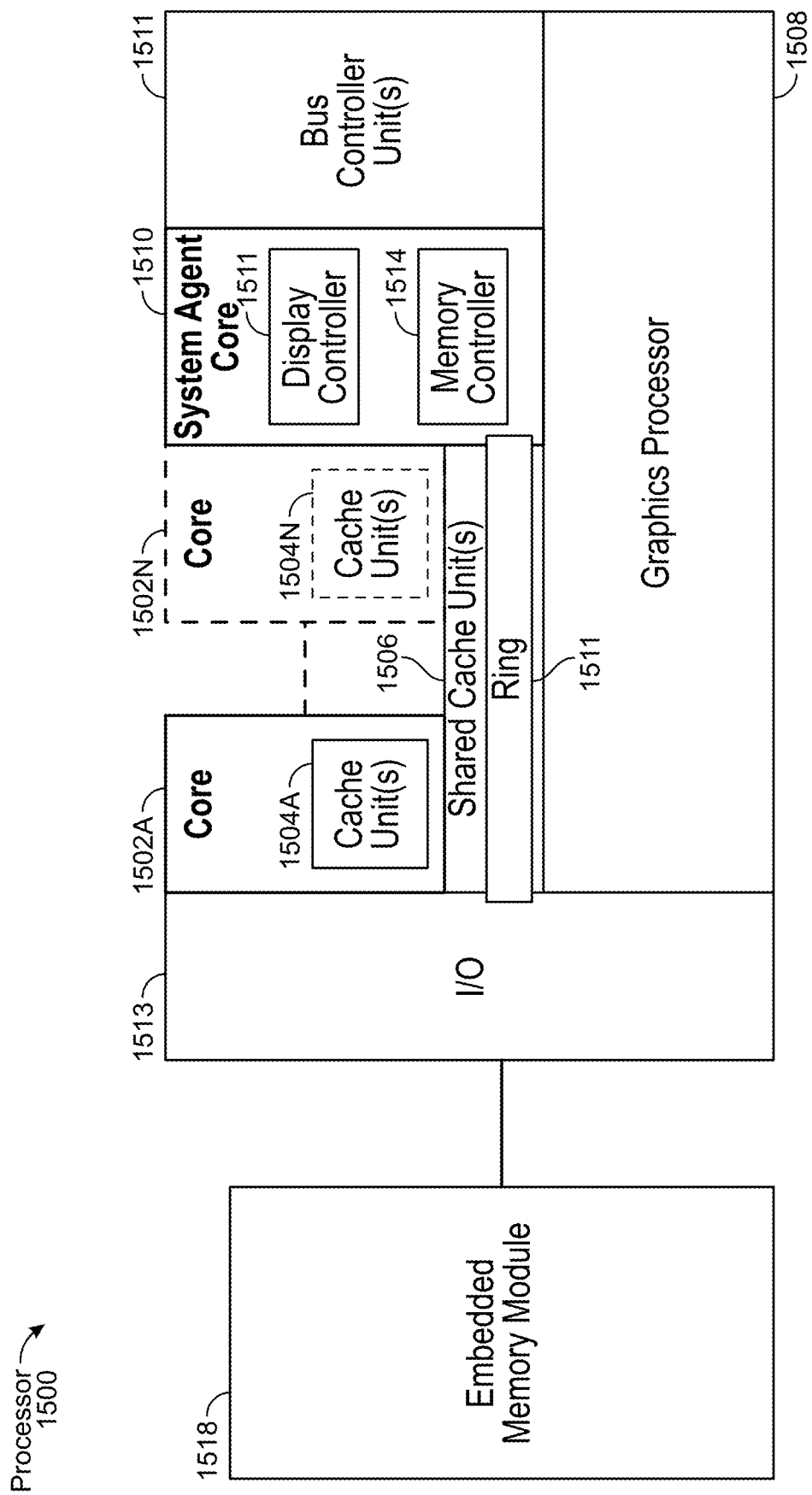
FIG. 15 is at least portions of a graphics processor, according to one or more embodiments.

FIG. 15 is a block diagram of a processor 1500 having one or more processor cores 1502A-1502N, an integrated memory controller 1514, and an integrated graphics processor 1508, according to at least one embodiment. In at least one embodiment, processor 1500 can include additional cores up to and including additional core 1502N represented by dashed lined boxes. In at least one embodiment, each of processor cores 1502A-1502N includes one or more internal cache units 1504A-1504N. In at least one embodiment, each processor core also has access to one or more shared cached units 1506.

In at least one embodiment, internal cache units 1504A-1504N and shared cache units 1506 represent a cache memory hierarchy within processor 1500. In at least one embodiment, cache memory units 1504A-1504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1506 and 1504A-1504N.

In at least one embodiment, processor 1500 may also include a set of one or more bus controller units 1516 and a system agent core 1510. In at least one embodiment, one or more bus controller units 1516 manage a set of peripheral buses, such as one or more PCI or PCI express busses. In at least one embodiment, system agent core 1510 provides management functionality for various processor components. In at least one embodiment, system agent core 1510 includes one or more integrated memory controllers 1514 to manage access to various external memory devices (not shown).

In at least one embodiment, one or more of processor cores 1502A-1502N include support for simultaneous multi-threading. In at least one embodiment, system agent core 1510 includes components for coordinating and operating cores 1502A-1502N during multi-threaded processing. In at least one embodiment, system agent core 1510 may additionally include a power control unit (PCU), which includes logic and components to regulate one or more power states of processor cores 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1514. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring interconnect 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor cores 1502A-1502N and graphics processor 1508 use embedded memory modules 1518 as a shared Last Level Cache.

In at least one embodiment, processor cores 1502A-1502N are homogenous cores executing a common instruction set architecture. In at least one embodiment, processor cores 1502A-1502N are heterogeneous in terms of instruction set architecture (ISA), where one or more of processor cores 1502A-1502N execute a common instruction set, while one or more other cores of processor cores 1502A-1502N executes a subset of a common instruction set or a different instruction set. In at least one embodiment, processor cores 1502A-1502N are heterogeneous in terms of microarchitecture, where one or more cores having a relatively higher power consumption couple with one or more power cores having a lower power consumption. In at least one embodiment, processor 1500 can be implemented on one or more chips or as an SoC integrated circuit.

Such components can be used to improve image quality during image reconstruction using historical acceleration and/or historical reset.

Figure 16:
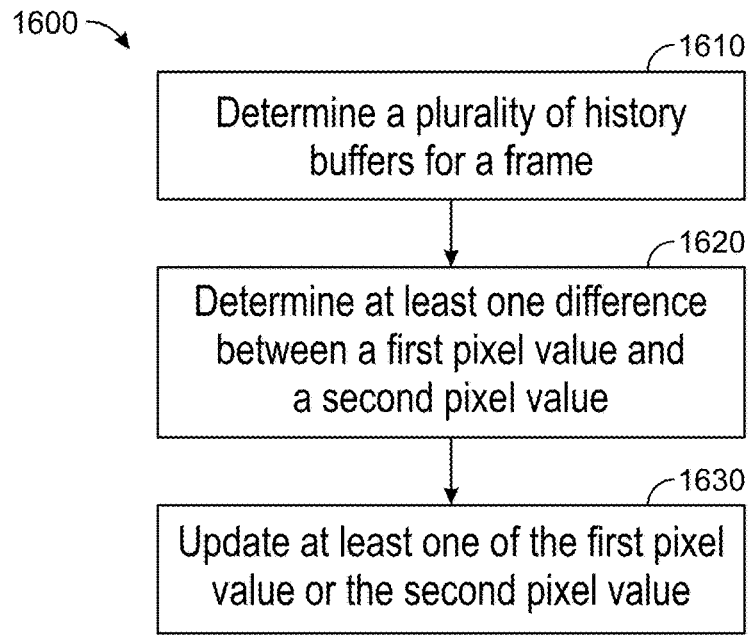
FIG. 16 is a block diagram of a flowchart for a method of history acceleration, according to one or more embodiments.

Referring now to FIG. 16, a flowchart for a method 1600 of history acceleration is shown, according to some embodiments. Denoiser 130 can be configured to perform method 1600. Further, any computing device described herein can be configured to perform method 1600.

In broad overview of method 1600, at block 1610, the denoiser (e.g., one or more processing circuits) can determine a plurality of history buffers for a frame. At block 1620, the denoiser can determine at least one difference between a first pixel value and a second pixel value. At block 1630, the denoiser can update at least one of the first pixel value or the second pixel value. Additional, fewer, or different operations may be performed depending on the particular arrangement. In some embodiments, some, or all operations of method 1600 may be performed by one or more processors executing on one or more computing devices, systems, or servers. In various embodiments, each operation may be re-ordered, added, removed, or repeated.

At block 1610, the denoiser can determine a plurality of history buffers for a frame, the plurality of history buffers including a responsive history buffer and a normal history buffer, the responsive history buffer being stored in a responsive history buffer, and the normal history buffer being stored in a normal history buffer, the responsive history buffer including a first pixel value at a pixel location of the frame, and the normal history buffer including a second pixel value at the pixel location of the frame. In some embodiments, the first pixel value of the responsive history buffer corresponding to the pixel location of the frame at a time t1 and the second pixel value of the normal history buffer corresponding to the pixel location of the frame at the time t1. In some embodiments, the normal history buffer corresponds to a first convergence rate to an expected pixel value of the input and the responsive history buffer corresponds to a second convergence rate to the expected pixel value, wherein the first convergence rate is less than the second convergence rate.

The use of both a responsive history buffer and a normal history buffer provides layered view of the pixel's behavior over time. For example, in a scenario where the frames are capturing a scene with a moving car under changing lighting conditions, the responsive history frame would hold data that reacts quickly to the changes in illumination and movement, while the normal history buffer would offer a more steady perspective, less affected by immediate changes. In some embodiments, the difference in the pixel values could also indicate the different responses of the buffers to the change in the scene. In particular, the responsive and normal history buffers can correspond to different convergence rates towards an expected pixel value of the input data. In the example of the moving car, the normal history buffer might slowly adapt to the changing conditions—this slower adaptation can be thought of as the first convergence rate. In contrast, the responsive history buffer quickly adjusts to these changes, evident in a second convergence rate which is faster than the first. If the lighting condition changes suddenly, like if a cloud obscures the sun, the responsive frame will react faster to this change, thus showing a quicker convergence towards the new expected pixel value.

In some embodiments, the at least one of the first pixel value or the second pixel value includes accelerating the normal history buffer by translating the first pixel value by an amount determined from the at least one difference and the tuning parameter, wherein accelerating the normal history buffer includes increasing the first convergence rate to the expected pixel value and accelerating the responsive history buffer by translating the second pixel value by the amount determined from the at least one difference and the tuning parameter, wherein accelerating the responsive history buffer includes increasing the second convergence rate to the expected pixel value. In some embodiments, prior to updating the at least one of the first pixel value or the second pixel value, the denoiser can scale the amount determined from the at least one difference and the tuning parameter by a clamping parameter based on a ratio of luminance of two or more of a clamped luminance, a normal luminance at the normal history buffer, or a responsive luminance at the history buffer.

At block 1620, the denoiser can determine at least one difference between the first pixel value of the responsive history buffer and the second pixel value of the normal history buffer. In particular, the difference is determined in accordance with the rates of convergence present in the two frames (i.e., responsive and normal), enabling the denoiser to capture and quantify the variations in the pixel values between the two buffers, providing a measure of the visual contrast introduced by the changes in the scene. For example, assume the first pixel value (from the responsive frame) has a luminance of 0.8, and the second pixel value (from the normal frame) has a luminance of 0.5. The difference in this case would be 0.8−0.5=0.3. This difference in luminance represents a variation in the scene which could be a result of a dynamic lighting change, an object moving across the scene or changes in the camera's viewpoint. It is this variation that the acceleration circuit 222 determines a response to reduce the presence of noise without compromising the sharpness of the scene. In another example, each pixel value could be a vector consisting of three components (red, green, and blue). In this example, the first pixel value from the responsive frame could have an RGB value of (200, 150, 100) and the second pixel value from the normal frame could have an RGB value of (180, 140, 110). The difference between these two pixel values would be a new RGB value of (20, 10, −10). The positive values indicate an increase in the intensity of red and green channels, while the negative value for the blue channel indicates a decrease in its intensity.

In some embodiments, each of the at least one of the first pixel value or the second pixel value correspond to one or more of a luminance space, a color space, or chrominance space, and wherein the luminance space includes an intensity component, the color space includes a plurality of color components, and the chrominance space includes a color variation component. In some embodiments, the at least one difference is a color space difference including a component vector of the plurality of color components, and wherein each component of the component vector is scaled based on the tuning parameter. With regard to the color space difference and using a component vector of the plurality of color components, the component vector could be (R, G, B). With reference to the above example, the component vector difference is (20, 10, −10). The denoiser could then scale this vector based on a tuning parameter to determine the degree to which each of these color differences should be considered in the denoising process. In another example, at block 1620, the denoiser determines the difference in luminance between these two history buffers. This difference would be |0.2−0.7|=0.5. Next, the denoiser will use a tuning parameter, which is the factor to scale this difference. In this example, the factor could be 2.0. However, as this pixel represents a moving object, this factor might be adjusted to a lower value, e.g., 1.5, to prevent overshooting and to better handle the abrupt changes in the scene's lighting. The scaled difference would then be 1.5*0.5=0.75. This scaled difference in luminance can then be used in the subsequent steps of the denoising process to update the pixel values. In some embodiments, the tuning parameter may be used to prioritize colors (e.g., red differences over green and blue differences). For example, the scaling process may magnify the red component while reducing the green and blue components, resulting in a new vector such as (40, 5, −5).

At block 1630, the denoiser can update at least one of the first pixel value or the second pixel value based on the at least one difference and a tuning parameter. In some embodiments, the update can include a linear or non-linear transformations based on the identified difference and the pre-set tuning parameter. The tuning parameter can act as a control knob, adjusting the degree to which the pixel value is updated, which in turn affects the sharpness and clarity of the output image. The updated pixel values are stored back into the historical buffer (e.g., normal history buffer 212 and responsive history buffer 214), ready for the next frame's processing. Accordingly, the update allows the denoiser to adapt the pixel values to better reflect the true state of the scene.

In some embodiments, the denoiser provides the updated at least one of the first pixel value or the second pixel value to at least one of the responsive history buffer or the normal history buffer, respectively, wherein updating the at least one of the first pixel value or the second pixel value occurs during a light transport simulation operation for the frame, and wherein the at least one of the first pixel value or the second pixel value is stored in at least one of the responsive history buffer or the normal history buffer, respectively. During the light transport simulation operation, the denoiser's operation can be in parallel, utilizing acceleration to enhance the output of the simulator. Each frame rendered by the light transport simulator can be immediately received and processed by the denoiser. The denoiser, using its buffers, accesses the historical pixel value data, compares it with the current frame data, and makes adjustments in real-time, refining the pixel values. Thus, the denoiser can operate on the data while it's fresh in the buffer, before the next frame arrives, providing integration with the ray-tracing pipeline. Additionally, the denoiser can output, to a display device, content including an updated pixel value of the updated plurality of pixel values corresponding to the normal history buffer. That is, while the denoiser output can be stored, it can also be presented in a display, which enables the viewer to experience enhanced visual clarity and improved visual content.

In some embodiments, determining the at least one difference and updating the at least one of the first pixel value or the second pixel value are based on temporally accumulated pixel data stored in the responsive history buffer and the normal history buffer without introducing new noise or using the expected pixel value of the frame, and wherein determining the at least one of the first pixel value or the second pixel value, determining the at least one difference, and updating of the at least one of the first pixel value or the second pixel value is based on the pixel location of one pixel. For example, if the pixel location of interest is (3, 3) (i.e., pixel location 1810 of FIG. 18), the denoiser could access both the responsive and normal buffers at this pixel location, compute the differences and update the respective pixel values based on the data at this location, avoiding any extraneous noise or influence from the expected frame pixel value. Accordingly, the update ensures that any changes reflect only the unique properties and behaviors of that specific pixel, improving the denoiser's capacity to deliver precise, high-quality denoising.

In some embodiments, the denoiser can (1) scale the at least one difference according to the tuning parameter to determine a first updated pixel value at the pixel location of the responsive history buffer and a second updated pixel value at the pixel location of the normal history buffer, (2) prior to updating the at least one of the first pixel value or the second pixel value, determine at least one of the first updated pixel value or the second updated pixel value exceeds an expected pixel value of an input, (3) determine a first dampened pixel value of the responsive history buffer at the pixel location based on a difference between (4) determine a first dampened pixel value of the responsive history buffer at the pixel location based on a difference between the expected pixel value and the first updated pixel value, and a ratio of the difference between the expected pixel value and the first updated pixel value to a first scaled amount corresponding to the first updated pixel value, (5) determine a second dampened pixel value of the normal history buffer at the pixel location based on a difference between the expected pixel value and the second updated pixel value, and a ratio of the difference between the expected pixel value and the second updated pixel value to a second scaled amount corresponding to the second updated pixel value, and (5) update, towards the expected pixel value, the at least one of the first pixel value or the second pixel value in accordance with the first dampened pixel value and the second dampened pixel value.

For example, the first updated pixel value corresponds to the luminance value at a pixel location in the responsive history buffer, and the second updated pixel value corresponds to the luminance value at a similar pixel location in the normal history buffer. In this example, assume that the initial determination determines that one or both of these updated pixel values would exceed the luminance of the noisy input signal, the expected pixel value. This suggests that if these updated pixel values were directly applied, it might result in overshooting the luminance of the input signal. To mitigate this potential issue, the method can involve determining the dampened pixel values for the responsive and normal history buffers. The dampening process can rely on the determination of the luminance distance between the expected pixel value (noisy input signal luminance) and the updated pixel values. The resulting difference is then scaled (or reduced) by a ratio of this difference to the originally calculated acceleration amount. Consequently, the dampened pixel values are smaller than the initially computed updated pixel values, reducing the chance of overshooting the noisy input signal luminance. These dampened pixel values can then be used to more accurately update the pixel values in the history buffers, driving them towards the expected pixel value at a pace that mirrors the lighting changes within the scene without overshooting.

Figure 17:
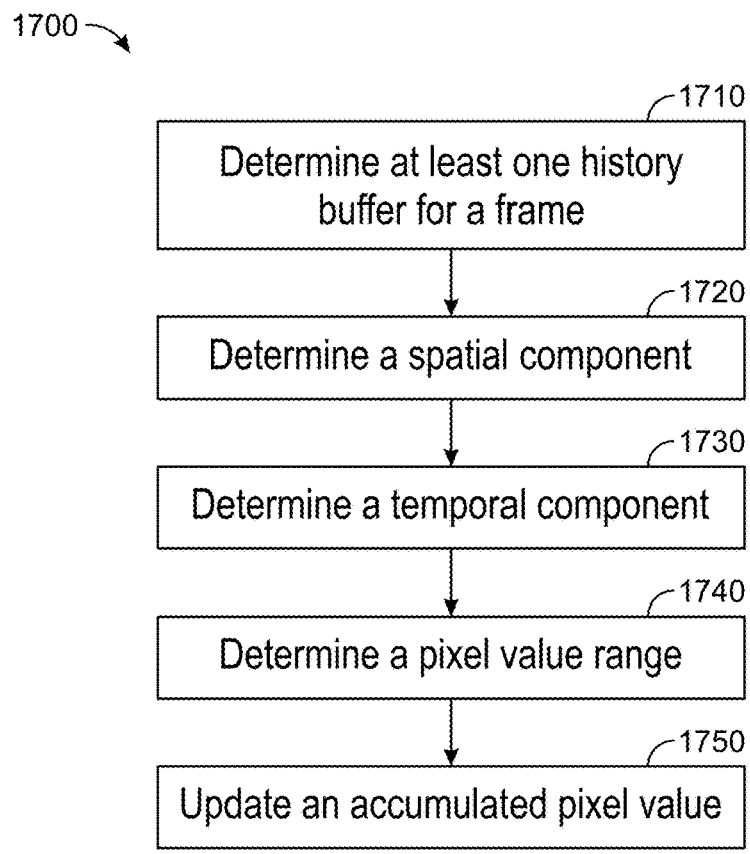
FIG. 17 is a block diagram of a flowchart for a method of history reset, according to one or more embodiments.

Referring now to FIG. 17, a flowchart for a method 1700 of history reset is shown, according to some embodiments. Denoiser 130 can be configured to perform method 1700. Further, any computing device described herein can be configured to perform method 1700.

In broad overview of method 1700, at block 1710, the denoiser (e.g., one or more processing circuits) can determine at least one history buffer for a frame. At block 1720, the denoiser can determine a spatial component. At block 1730, the denoiser can determine a temporal component. At block 1740, the denoiser can determine a pixel value range. At block 1750, the denoiser can determine update an accumulated pixel value. Additional, fewer, or different operations may be performed depending on the particular arrangement. In some embodiments, some, or all operations of method 1600 may be performed by one or more processors executing on one or more computing devices, systems, or servers. In various embodiments, each operation may be re-ordered, added, removed, or repeated.

At block 1710, the denoiser can determine at least one history buffer for a frame, the at least one history buffer including an accumulated frame or other representation having an accumulated pixel value at a pixel location of the frame. In particular, the denoiser determines at least one history buffer for a given frame. This history buffer includes an accumulated pixel value at a specific pixel location within the frame. The history buffer can be of two types, the normal history buffer 212 and the responsive history buffer 214, each accumulating the input noisy signal with distinct weighting values.

In some embodiments, the history buffer is a multi-channel buffer storing a plurality of color channels and a mean of a square of a luminance at the pixel location of the at least one history buffer, and wherein the one or more changes in the accumulated pixel value is stored as the mean of the square of the luminance in the multi-channel buffer. For example, the history buffer can be a 4-channel buffer, storing a plurality of color channels—Red, Green, Blue, and a mean of the square of luminance ($RGBL^2$)—at the pixel location of the at least one history buffer. As changes in accumulated pixel values occur, these are stored within the multi-channel buffer as the mean of the square of the luminance.

At block 1720, the denoiser can determine, in a spatial domain, a spatial component of the accumulated pixel value at the pixel location based on a first spatial moment and a second spatial moment, wherein the first spatial moment corresponds to a mean of a set of accumulated pixel values within a spatial region including the pixel location in the at least one history buffer, and wherein the second spatial moment corresponds to a spatial variance corresponding to one or more changes in the set of accumulated pixel values within the spatial region in the at least one history buffer. In particular, the denoiser evaluates a spatial component of the accumulated pixel value at a given pixel location. This determination is based on a first spatial moment, which is the mean of accumulated pixel values within a specified spatial region, and a second spatial moment, which is the spatial variance corresponding to variations in the set of accumulated pixel values within that same region. This spatial region can vary in size, such as 3×3, 5×5, or 7×7 pixel blocks. The reset circuit 226 can calculate this spatial variance, using this as part of the criteria for adjusting the history buffer in response to the spatial characteristics of the noisy input signal.

At block 1730, the denoiser can determine, in a temporal domain, a temporal component of the accumulated pixel value at the pixel location based on a first temporal moment and a second temporal moment, wherein the first temporal moment includes the accumulated pixel value, and wherein the second temporal moment includes a temporal variance corresponding to one or more changes in the accumulated pixel value at the pixel location. In particular, the denoiser determines a temporal component of the accumulated pixel value at a particular pixel location. This evaluation is based on the first temporal moment, which is the accumulated pixel value, and the second temporal moment, which is the temporal variance corresponding to changes in the accumulated pixel value at the pixel location across multiple history buffers. The reset circuit 226 can compute this temporal variance, using the spatial variance to inform decisions about history reset.

At block 1740, the denoiser can determine a pixel value range based at least on the spatial component in the spatial domain and the temporal component in the temporal domain and determine an amount of historical reset to apply to the history buffer based at least on the accumulated pixel value at the pixel location of the at least one history buffer, a current pixel value of input data at the pixel location of the frame, and the pixel value range. In particular, the denoiser can determine a pixel value range (Equation 5) based at least on the spatial component in the spatial domain and the temporal component in the temporal domain. In some embodiments, the range is calculated based on the standard deviations of pixel values in both the spatial and temporal domain. The denoiser computes the average and variance (i.e., first and second moments) of these values, and these statistical properties are then used to compute a range of acceptable pixel values. The denoiser then manages the historically accumulated pixel values and resets based on whether the changes in pixel value (e.g., luminance, color space, chrominance) fall within or outside this range.

In some embodiments, the pixel value range is further based a spatial tolerance and a temporal tolerance, wherein the spatial component is scaled by the spatial tolerance and the temporal component is scaled by the temporal tolerance, wherein at least one of the spatial tolerance or the temporal tolerance is based on a light transport simulation technique or implementation. In some embodiments, the standard deviations can be scaled by spatial and temporal tolerances, represented by S and T, respectively. These tolerances are parameters that define the denoiser's sensitivity to noise in each domain, with their values typically informed by the specifics of the light transport simulation technique or implementation used.

In some embodiments, the reset is used to maintain an optimal balance between preserving the pixel history in the history buffer and adapting to the changes in the pixel values in the current input frame. To accomplish this, the denoiser first determines an amount of historical reset of the history buffer. This amount can be calculated based on a specific set of parameters related to the pixel's luminance or color values. One of these parameters is the accumulated pixel value at the pixel location of at least one history buffer. This accumulated pixel value (accumulatedL), can represent the average pixel value of a specific pixel in the history buffer over a certain period of time or number of frames. Another parameter that guides the historical reset is the current pixel value of input data at the pixel location of the frame (noisyInputL). This can be the pixel's luminance value (or color value in some instances) in the current noisy input frame. It represents the brightness or color of the pixel in the most recent frame. Another parameter involved in determining the amount of historical reset is the pixel value range. This range, computed using the spatial and temporal standard deviations (spatialSigma and temporalSigma) of pixel values, provides an acceptable interval for pixel changes. Taking these parameters into consideration, the denoiser then calculates the historical reset amount (Equation 6). The reset calculation includes determining the absolute difference between the accumulated and input signal luminance (or another pixel value), subtracting the tolerance range, and then scaling this value based on the responsiveness of the denoiser and the sum of accumulated luminance and the tolerance range.

In some embodiments, determining the amount of historical reset of the history buffer is in response to the current pixel value of the input data at the pixel location of the frame being outside the pixel value range. In particular, the current pixel value can trigger the history reset when the current pixel value exceeds the range (e.g., lower or upper bound of the pixel value range). For example, if the current pixel value (noisyInputL) lies outside the range of acceptable pixel values as determined by the spatial and temporal standard deviations, it implies a significant deviation from the expected pixel behavior. This could be due to a variety of factors such as a change in lighting conditions, movement of objects, or changes in color dynamics of the scene. Thus, the deviation from the computed range suggests that the historical pixel value stored in the buffer may no longer be representative of the current scene conditions. Consequently, the denoiser can initiate a history reset, adjusting the accumulated pixel value in the buffer towards the current pixel value.

At block 1750, the denoiser can update the accumulated pixel value based at least on the amount of historical reset. Accordingly, once the history reset amount is determined, the denoiser uses this value to adjust the accumulated history towards the raw noisy input. In some embodiments, this is done using a linear interpolation function, or lerp, which can "blend" the accumulated history with the raw noisy input using the history reset amount as the blend factor. In particular, a new value is determined that falls between the current accumulated history and the current noisy input, influenced by the calculated historical reset amount (Equation 6). With reference to Equation 6, accumulatedL denotes the historical accumulated pixel value in the history buffer for a specific pixel location, noisyInput represents the pixel value from the current noisy input frame at the same pixel location, and historyResetAmount is the calculated value that determines the degree to which the accumulated pixel value should be shifted towards the noisy input value. By applying this function, the denoiser ensures a balance between maintaining historical pixel data and accommodating new data from the most recent frame. This updated pixel value, which is a blend of historical and current data, is then used as input for the temporal accumulation stage for the next frame, enabling a smooth transition between frames while effectively managing spatial and temporal noise. In some embodiments, the amount of historical reset is scaled according to a tuning parameter, known as a LERP factor, which corresponds to a blending rate of input data with the at least one history buffer. In general, the LERP factor regulates the degree of linear interpolation between the current input data and the existing historical data. The blending guided by this LERP factor balances the influence of newer data against the older accumulated values, adjusting the sensitivity of the denoiser to changes in pixel values.

Referring now to FIG. 18, a pixel region 1800 is shown, according to some embodiments. The pixel region (sometimes referred to herein as a "pixel area" or a "spatial area") include a plurality of pixels. As shown, the pixel region 1800 is a 5×5 pixel region, where each pixel can be a different pixel value or pixel luminance. For example, pixel 1810 could be an intermediate value in the grayscale spectrum, representing a moderate degree of luminance. Other pixels could display a wider range of values, from a completely dark pixel to a fully bright pixel. This variety in pixel values within the 5×5 pixel region 1800 reflects the varying visual characteristics of the scene being rendered. The denoiser 130 can process each of these pixels across one or more frames, adjusting (e.g., accelerating, resetting) the pixel values based on characteristics captured within this region.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection including one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program including a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system including multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may include one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   determining a plurality of history buffers for a frame, the plurality of history buffers comprising a responsive history buffer and a normal history buffer, the responsive history buffer comprising a first pixel value at a pixel location of the frame, and the normal history buffer comprising a second pixel value at the pixel location of the frame;

determining at least one difference between the first pixel value of the responsive history buffer and the second pixel value of the normal history buffer; and updating at least one of the first pixel value or the second pixel value based on the at least one difference and a tuning parameter;

wherein the normal history buffer corresponds to a first convergence rate to an expected pixel value of a noisy input signal and the responsive history buffer corresponding to a second convergence rate to the expected pixel value.

2. The computer-implemented method of claim 1, wherein;

the first pixel value of the responsive history buffer corresponding to the pixel location of the frame at a time t1; and the second pixel value of the normal history buffer corresponding to the pixel location of the frame at the time t1.

3. The computer-implemented method of claim 2, further comprising:

scaling the at least one difference according to the tuning parameter to determine a first updated pixel value at the pixel location of the responsive history buffer and a second updated pixel value at the pixel location of the normal history buffer;

prior to updating the at least one of the first pixel value or the second pixel value, determining at least one of the first updated pixel value or the second updated pixel value exceeds an expected pixel value of an input;

determining a first dampened pixel value of the responsive history buffer at the pixel location based on a difference between the expected pixel value and the first updated pixel value, and a ratio of the difference between the expected pixel value and the first updated pixel value to a first scaled amount corresponding to the first updated pixel value;

determining a second dampened pixel value of the normal history buffer at the pixel location based on a difference between the expected pixel value and the second updated pixel value, and a ratio of the difference between the expected pixel value and the second updated pixel value to a second scaled amount corresponding to the second updated pixel value; and updating the at least one of the first pixel value or the second pixel value in accordance with the first dampened pixel value and the second dampened pixel value.

4. The computer-implemented method of claim 2, wherein the first convergence rate is less than the second convergence rate.

5. The computer-implemented method of claim 1, wherein the at least one of the first pixel value or the second pixel value comprises:

accelerating the normal history buffer by translating the first pixel value by an amount determined from the at least one difference and the tuning parameter, wherein accelerating the normal history buffer comprises increasing the first convergence rate; and accelerating the responsive history buffer by translating the second pixel value by the amount determined from the at least one difference and the tuning parameter, wherein accelerating the responsive history buffer comprises increasing the second convergence rate.

6. The computer-implemented method of claim 5, wherein prior to updating the at least one of the first pixel value or the second pixel value, the method further comprises:

scaling the amount determined from the at least one difference and the tuning parameter by a clamping parameter based on at least one of: a ratio of luminance of two or more of a clamped luminance, a normal luminance at the normal history buffer, or a responsive luminance at the history buffer.

7. The computer-implemented method of claim 1, wherein each of the at least one of the first pixel value or the second pixel value correspond to one or more of a luminance space, a color space, or chrominance space, and wherein the luminance space comprises an intensity component, the color space comprises a plurality of color components, and the chrominance space comprises a color variation component.

8. The computer-implemented method of claim 7, wherein the at least one difference is a color space difference comprising a component vector of the plurality of color components, and wherein each component of the component vector is scaled based on the tuning parameter.

9. The computer-implemented method of claim 1, further comprising:

providing the updated at least one of the first pixel value or the second pixel value to at least one of the responsive history buffer or the normal history buffer, respectively, wherein updating the at least one of the first pixel value or the second pixel value occurs during a light transport simulation operation for the frame, and wherein the at least one of the first pixel value or the second pixel value is aggregated as part of at least one of the responsive history buffer or the normal history buffer, respectively; and outputting, to a display device, content comprising an updated pixel value of the updated plurality of pixel values corresponding to the normal history buffer.

10. The computer-implemented method of claim 1, wherein the determining the at least one difference and updating the at least one of the first pixel value or the second pixel value are based on temporally accumulated pixel data stored in the responsive history buffer and the normal history buffer without introducing new noise or using the expected pixel value of the frame.

11. The computer-implemented method of claim 1, wherein determining the at least one of the first pixel value or the second pixel value, comprises determining the at least one difference, and updating of the at least one of the first pixel value or the second pixel value is based on a pixel location of a pixel corresponding to the at least one of the first pixel value or the second pixel value.

12. A system, comprising:

a temporal accumulator system to temporally accumulate pixel data associated with a plurality of history buffers for a frame and provide the temporally accumulated pixel data to a history system, wherein the plurality of history buffers comprising a responsive history buffer and a normal history buffer, the responsive history buffer comprises a first pixel value at a pixel location of the frame, and the normal history buffer comprises a second pixel value at the pixel location of the frame;

the history system to:

receive the temporally accumulated pixel data corresponding to the first pixel value and the second pixel value;

determine at least one difference of the first pixel value and the second pixel value; and update at least one of the first pixel value and the second pixel value based on the at least one difference and a tuning parameter; and a spatial filterer system to apply one or more spatial filters to the updated at least one of the first pixel value and the second pixel value and output the updated and spatially filtered at least one of the first pixel value and the second pixel value;

wherein the normal history buffer corresponds to a first convergence rate to an expected pixel value of a noisy input signal and the responsive history buffer corresponding to a second convergence rate to the expected pixel value.

13. The system of claim 12, wherein;
the first pixel value of the responsive history buffer corresponding to the pixel location of the frame at a time t1; and
the second pixel value of the normal history buffer corresponding to the pixel location of the frame at the time t1.

14. The system of claim 12, wherein the first convergence rate is less than the second convergence rate.

15. The system of claim 12, wherein the at least one of the first pixel value or the second pixel value comprises:
accelerating the normal history buffer by translating the first pixel value by an amount determined from the at least one difference and the tuning parameter, wherein accelerating the normal history buffer comprises increasing the first convergence rate to the expected pixel value; and
accelerating the responsive history buffer by translating the second pixel value by the amount determined from the at least one difference and the tuning parameter, wherein accelerating the responsive history buffer comprises increasing the second convergence rate to the expected pixel value.

16. The system of claim 15, wherein prior to updating the at least one of the first pixel value or the second pixel value, the history system is further to:
scale the amount determined from the at least one difference and the tuning parameter by a clamping parameter based on at least one of: a ratio of luminance of two or more of a clamped luminance, a normal luminance at the normal history buffer, or a responsive luminance at the history buffer.

17. The system of claim 12, wherein each of the at least one of the first pixel value or the second pixel value correspond to one or more of a luminance space, a color space, or chrominance space, and wherein the luminance space comprises an intensity component, the color space comprises a plurality of color components, and the chrominance space comprises a color variation component.

18. The system of claim 17, wherein the at least one difference is a color space difference comprising a component vector of the plurality of color components, and wherein each component of the component vector is scaled based on the tuning para meter.

19. The system of claim 12, wherein the determining the at least one difference and updating the at least one of the first pixel value or the second pixel value are based on temporally accumulated pixel data stored in the responsive history buffer and the normal history buffer without introducing new noise or using the expected pixel value of the frame, and wherein determining the at least one of the first pixel value or the second pixel value, determining the at least one difference, and updating of the at least one of the first pixel value or the second pixel value is based on the pixel location of one pixel.

20. A system, comprising:
an application programming interface (API) to interface with one or more applications executed using one or more circuits, the API to cause the one or more circuits to:
determine a plurality of history buffers for a frame, the plurality of history buffers comprising a responsive history buffer and a normal history buffer, the responsive history buffer comprises a first pixel value at a pixel location of the frame, and the normal history buffer comprises a second pixel value at the pixel location of the frame;
determine at least one difference between the first pixel value of the responsive history buffer and the second pixel value of the normal history buffer; and
update at least one of the first pixel value or the second pixel value based on the at least one difference and a tuning parameter;
wherein the normal history buffer corresponds to a first convergence rate to an expected pixel value of a noisy input signal and the responsive history buffer corresponding to a second convergence rate to the expected pixel value.

* * * * *